US007011357B2

(12) United States Patent
Seksaria et al.

(10) Patent No.: US 7,011,357 B2
(45) Date of Patent: Mar. 14, 2006

(54) WINDOW ASSEMBLY FOR A MOTOR VEHICLE

(75) Inventors: Dinesh C. Seksaria, Novi, MI (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/996,784

(22) Filed: Nov. 24, 2004

(65) Prior Publication Data

US 2005/0110297 A1 May 26, 2005

Related U.S. Application Data

(62) Division of application No. 10/310,322, filed on Dec. 5, 2002, now Pat. No. 6,860,537.

(60) Provisional application No. 60/338,177, filed on Dec. 5, 2001.

(51) Int. Cl.
*B60J 1/18* (2006.01)
*B60J 5/10* (2006.01)

(52) U.S. Cl. .................... 296/146.2; 296/56; 296/154; 296/146.8; 296/146.12

(58) Field of Classification Search ................. 296/56, 296/154, 146.2, 146.8, 146.11, 146.12, 91
See application file for complete search history.

(56) References Cited

U.S. PATENT DOCUMENTS

| | | | | |
|---|---|---|---|---|
| 5,449,213 | A | 9/1995 | Kiley et al. | 296/56 |
| 5,944,373 | A | 8/1999 | Seksaria et al. | 296/57.1 |
| 5,947,536 | A | 9/1999 | Mizuki et al. | |
| 6,000,747 | A | 12/1999 | Sehgal et al. | |
| 6,003,931 | A | 12/1999 | Dancasius et al. | 296/146.8 |
| 6,053,562 | A | 4/2000 | Bednarski | |
| 6,123,384 | A | 9/2000 | Eustache et al. | |
| 6,234,564 | B1 | 5/2001 | Kim | |
| 6,659,583 | B1 | 12/2003 | Scheid | |
| 6,733,063 | B1 * | 5/2004 | Paiva et al. | 296/56 |
| 2002/0046505 | A1 | 4/2002 | Seksaria et al. | 49/502 |
| 2003/0085589 | A1 | 5/2003 | Oberheide | |

* cited by examiner

*Primary Examiner*—Jason Morrow
(74) *Attorney, Agent, or Firm*—David P. Maivald; Eckert Seamans Cherin & Mellott, LLC

(57) ABSTRACT

The liftgate for a motor vehicle includes a frame member, an inner panel, and an outer panel. The frame member is a U-shaped member formed by a cross member and a pair of spaced apart legs extending from the cross member. The inner panel is connected to the legs and extends part way up the legs of the frame member. The outer panel is connected to the inner panel and is positioned opposite the legs and an inner side of the inner panel. The outer panel also extends part way up the legs of the frame member. The frame member defines a window opening with the inner panel and the outer panel. The frame member forms the entire upper portion of the liftgate.

14 Claims, 18 Drawing Sheets

WINDOW ASSEMBLY FOR A MOTOR VEHICLE

CROSS REFERENCE TO RELATED APPLICATION

The present application is a divisional of and claims priority from U.S. Ser. No. 10/310,322 filed Dec. 5, 2002, entitled "DOOR FOR A MOTOR VEHICLE," now U.S. Pat. No. 6,860,537.

This application claims the benefit of U.S. Provisional Application Ser. No. 60/338,177 filed Dec. 5, 2001, and entitled "Lightweight Multiproduct Vehicle Liftgate, Hinge and Method", the disclosure of which is incorporated fully herein.

BACKGROUND OF THE INVENTION

1. Field of the Invention

The present invention relates generally to motor vehicles, such as passenger cars, light trucks, sport utility vehicles, mini-vans, and other similar vehicles. More particularly, the present invention relates generally to liftgates for such motor vehicles and, even more particularly, to a lightweight, aluminum, and thin profile liftgate for motor vehicles.

2. Description of Related Art

Liftgates are installed in several types of motor vehicles including mini-vans, sport utility vehicles, hatchback cars, and other similar vehicles. They are used most prominently in mini-vans. Liftgates provide access to a rear storage compartment generally found in these vehicles.

Current liftgates are typically assembled from two deep-drawn steel sheet panels and a number of stamped steel sheet reinforcement panels, which are resistance spot-welded to the deep-drawn steel sheet panels. This method of construction utilizes the steel sheet panels primarily to meet required stiffness and strength requirements for the liftgate. Liftgates made by this construction method are thick in cross section, typically measuring five to six (5–6) inches at their thickest point. The thickness of such prior art liftgates takes away from the available cargo space in the rear storage compartment of the vehicle. Additionally, the increased weight of the liftgate made by this construction method makes it difficult to open and close the liftgate, which requires vehicle manufacturers to add various lift assist devices to aid in raising the liftgate. Vehicle manufactures are extremely sensitive to vehicle weight because of government mandates for fuel economy and emissions, which makes the use of heavy liftgates disadvantageous.

The current method of construction for liftgates requires that the latch and other hardware associated with the liftgate be installed on the liftgate by inserting, fastening, and connecting a number of individual components in the cavity defined between the steel sheet panels. Generally, the individual components are assembled through holes punched in the steel sheet panels. This process is difficult, slow, and is error prone, which results in significant repair and warranty costs, and further results in dissatisfied customers. Additionally, the confined and narrow spaces within which the assembly line workers or service technicians must operate occasionally cause injuries to these workers.

A recent development in liftgate design incorporates a flip glass, which may be flipped upward for access to the rear storage compartment without having to lift the heavy liftgate itself. A rear glass wiper motor assembly is typically mounted along the bottom center edge of the flip glass. The flip glass requires a latching mechanism to lock the flip glass to the liftgate. The latching mechanism is also typically mounted along the bottom center edge of the flip glass. A safety brake light is typically mounted along the top center edge of the flip glass. The flip glass design currently used in the automotive industry further requires the use of a second pair of hinges to attach the flip glass to the liftgate, as well as an additional lift assist mechanism for pivoting the flip glass upward to allow access to the rear storage compartment. The current flip glass design known in the art results in a non-smooth surface in the rear of the vehicle, which negatively effects vehicle styling and increases aerodynamic drag. Additionally, this type of construction requires a large window frame, which reduces visibility through the liftgate window. This reduces safety while driving the vehicle, for example, when looking for vehicles approaching from the rear. The reduced visibility is also a significant drawback when backing up the vehicle, for example, while parking the vehicle.

Attempts have been made in the automotive industry to reduce the weight of vehicle body panels by using lighter weight construction materials, such as aluminum and plastic. For example, U.S. Pat. No. 5,449,213 to Kiley et al. discloses an aluminum movable liftgate having a tubular frame located between a pair of inner panels and a pair of outer panels. The frame functions as the load-bearing structure for the liftgate. However, no provision is made in the disclosed liftgate for hardware or for contour and other design preferences for a liftgate installed at the rear of a vehicle. Further, this liftgate does not include flip glass and other design features that are preferred by customers in the marketplace. The disclosure of U.S. Pat. No. 5,449,213 to Kiley et al. is incorporated herein by reference.

Another example of an attempt to reduce the weight of vehicle body panels is disclosed in U.S. Pat. No. 6,003,931 to Dancasius et al. This reference discloses a swiveling or sliding hatchback for a vehicle that incorporates materials having lower weight to reduce the overall weight of the hatchback. The hatchback includes a continuous frame element and inner and outer skins mounted on the frame element. The inner and outer skins are formed of light metal or plastic and are reinforced with reinforcing ribs.

A further example of the trend toward reducing the weight of vehicle body panels is disclosed in U.S. patent application Publication No. 2002/0046505A1 to Seksaria et al., the disclosure of which is incorporated herein by reference. This publication discloses a sliding door for a mini-van that is comprised of a rectangular shaped space frame and inner and outer door panels attached to the space frame. Hardware for operation of the sliding door is mounted on the exposed inside surface of the sliding door.

Accordingly, a need remains for a thin, lightweight liftgate that maximizes vehicle interior space but also allows ready access to the rear storage compartment in a vehicle such as a mini-van, sport utility vehicle, hatchback car, and other similar vehicles.

SUMMARY OF THE INVENTION

The present invention is a vehicle door, preferably in the form of a liftgate for a vehicle such as a mini-van, sport utility vehicle, hatchback car, and other similar vehicles. The vehicle door is generally comprised of U-shaped frame member, an inner panel, and an outer panel. The frame member, the inner panel, and the outer panel may be made from a variety of materials including aluminum, steel, and plastic, with aluminum being preferred. The frame member is preferably U-shaped and comprises a cross member and a pair of spaced apart legs extending from the cross member. The frame member primarily carries the structural load in the vehicle door. The inner panel has an inner side and an outer side. The outer side is connected to the legs of the frame member. The inner panel preferably extends only part way up the legs of the frame member. The outer panel is connected to the inner panel and is positioned opposite the legs of the frame member and the outer side of the inner panel. The outer panel preferably extends only part way up the legs of the frame member.

The frame member generally performs the function of carrying the structural load of the liftgate. The frame member also provides mounting locations for supporting several functional components used on the liftgate, such as hinges and lift assist mechanisms, as discussed further herein. The hinges attached to the frame member are used to attach the vehicle door to the body of a vehicle. Once assembled, the maximum thickness of the vehicle door is preferably about 35 millimeters. At least one of the frame member, the inner panel, and the outer panel is preferably formed from aluminum.

The frame member may comprise a tube, preferably a hydroformed steel or aluminum tube. The tube may be formed with different cross sectional profiles along its length, which provide convenient mounting locations for attaching the functional hardware mentioned previously (i.e., hinges and lift assist mechanisms, etc.).

The inner panel may define at least one depression in the inner side for increased strength and rigidity. The at least one depression forms at least one raised portion on the outer side having at least one contact surface facing an inner side of the outer panel. The vehicle door may further comprise at least one cushioning member positioned between the at least one contact surface and the inner side of the outer panel to connect the inner and outer panels. The outer side of the inner panel may define a pair of recesses for receiving the legs of the frame member. Preferably, the legs of the frame member are connected fixedly in the recesses.

The vehicle door may comprise a locking hardware assembly connected to the inner side of the inner panel for locking the vehicle door to the vehicle body. The locking hardware assembly may comprise a hardware carrier and a pair of door locking mechanisms mounted to the hardware carrier, preferably substantially at opposite ends of the hardware carrier. The hardware carrier is preferably connected fixedly to the inner side of the inner panel.

The vehicle door may further comprise at least one hinge connected to the frame member, for example the cross member. The at least one hinge may comprise a first member, a second member configured to pivotally connect the vehicle door to the vehicle body, and a third member. The first member is preferably pivotally associated with the second member and mounted to the frame member. The third member is preferably pivotally associated with the first member and supports a window assembly comprising a window for covering a window opening in the vehicle door. The window opening is defined by the frame member, the inner panel, and the outer panel. The third member of the at least one hinge may pivotally associated with the first member such that the window assembly is pivotal between a first position wherein the window substantially closes the window opening, and a pivoted second position allowing access to the window opening. A sealing gasket may be attached to an inner side of the window for creating a seal between the window, frame member, and outer panel.

The window assembly may further comprise a valance connected to the window. The valance may be mounted to the third member of the at least one hinge for enabling pivotal movement of the window assembly independent of the vehicle door. The valance may comprise an integrally formed air deflector extending downward along the window. A brake light for the vehicle may be mounted to the valance.

The window assembly may further comprise at least one wiper motor and blade assembly, which may be mounted through the window and connected to the valance. Alternatively, the wiper motor and blade assembly may be mounted to the valance and be positioned between the valance and an outer side of the window. The locking hardware assembly may further comprise at least one window locking mechanism, which may be configured to coact with at least one window latch mounted on the window to lock the window. The window locking mechanism may be mounted to the hardware carrier along a top end of the hardware carrier.

Additionally, the vehicle door may comprise at least one lift assist mechanism connected to the frame member. The at least one lift assist mechanism may have a first end connected to the frame member and a second end configured for connection to the vehicle body. The lift assist mechanism may be a gas-assist strut, a powered linear screw strut, and the like.

The present invention is also a window assembly for a vehicle door. The window assembly generally comprises a window for covering a window opening in the vehicle door, at least one hinge, and a valance connected to the window. The at least one hinge preferably comprises a first member, a second member configured to pivotally connect the vehicle door to the vehicle body, and a third member. The first and third members may each be individually pivotally associated with the second member. The valance is preferably mounted to the third member for enabling pivotal movement of the window and valance independent of the vehicle door. The valance preferably comprises an integrally formed air deflector extending downward along the window. The window assembly may include at least one wiper motor and blade assembly mounted through the window and connected to the valance. Alternatively, the wiper motor and blade assembly may be mounted to the valance between the valance and the outer side of the window. The window assembly preferably further comprises at least one window latch mounted to the window for locking the window to the vehicle door. Further, the window assembly may include a brake light for the vehicle. The brake light is preferably mounted to the valance.

The present invention is also a method of assembling a vehicle door. The method generally comprises the steps of: providing an inner panel having an inner side and an outer side; providing an outer panel having an inner side and an outer side; providing a U-shaped frame member comprising a cross member and a pair of spaced apart legs extending from the cross member; fixing the legs of the frame member to the outer side of the inner panel, such that the inner panel extends only part way up the legs of the frame member; and fixing the outer panel to the inner panel such that the inner side of the outer panel is positioned opposite the legs of the frame member and the outer side of the inner panel, the outer panel extending only part way up the legs of the frame member.

The outer side of the inner panel may define a pair of recesses. The step of fixing the legs of the frame member to the outer side of the inner panel may comprise positioning the legs of the frame member in the recesses, and fixing the legs in the recesses. The step of providing the inner panel may comprise stamping the inner panel from a sheet of material, preferably aluminum. The method may further comprise the step of forming at least one depression in the inner side of the inner panel, the at least one depression defining at least one raised portion on the outer side of the inner panel having at least one contact surface. The method may further comprise the step of placing at least one cushioning member between the at least one contact surface and the inner side of the outer panel to connect the inner and outer panels.

The step of providing the outer panel may comprise stamping the outer panel from a sheet of material, preferably aluminum. The steps of providing the inner and outer panels may comprise stamping the inner and outer panels in a single stamping. The method may further comprise the step of stamping a hardware carrier for supporting a pair of door locking mechanisms with the inner and outer panels in the single stamping. The method may further comprise the steps of mounting the door locking mechanisms substantially at opposite ends of the hardware carrier, and fixing the hardware carrier to the inner side of the inner panel.

The step of providing the frame member may comprise hydroforming the frame member from a tube. The step of hydroforming the frame member from the tube may further comprise forming different cross sectional profiles along the length of the tube. The tube may be formed from aluminum. The method may further comprise providing a locking hardware assembly of the vehicle door, and fixing the locking hardware assembly to the inner side of the inner panel.

The method of assembling the vehicle door may additionally comprise the steps: of providing a window assembly of the vehicle door, the window assembly comprising a window for covering a window opening in the vehicle door, at least one hinge comprising a first member, a second member configured to pivotally connect the vehicle door to the body of a vehicle, and a third member, the first and third members each individually pivotally associated with the second member, and a valance connected to the window and mounted to the third member; and connecting the first member to the frame member to mount the window assembly to the vehicle door, such that the window assembly is independently pivotal from the vehicle door.

Further, the method may comprise the step of attaching at least one lift assist mechanism to the frame member. The lift assist mechanism may have a first end connected to the frame member and a second end configured for connection to the vehicle body.

Moreover, the present invention is a method of assembling a window assembly for a vehicle door, which generally comprises the steps of: providing a window for covering a window opening in the vehicle door; attaching a valance to the window; providing at least one hinge comprising a first member, a second member configured to pivotally connect the vehicle door to the body of a vehicle, the first and third members pivotally associated with the second member; and mounting the valance to the third member for enabling pivotal movement of the window and valance independent of the vehicle door.

The method of assembling the window assembly may further comprise the steps of mounting at least one wiper motor and blade assembly through the window, and connecting the at least one wiper motor and blade assembly to the valance. Alternatively, the at least one wiper motor and blade assembly may be mounted to the valance between the valance and an outer side of the window. The method of assembling the window assembly may further comprise the step of mounting at least one window latch to the window for locking the window to the vehicle door.

A complete understanding of the invention will be obtained from the following detailed description when read in conjunction with the accompanying drawing figures wherein like reference characters identify like parts throughout.

DESCRIPTION OF THE PREFERRED EMBODIMENTS

Figure 1:
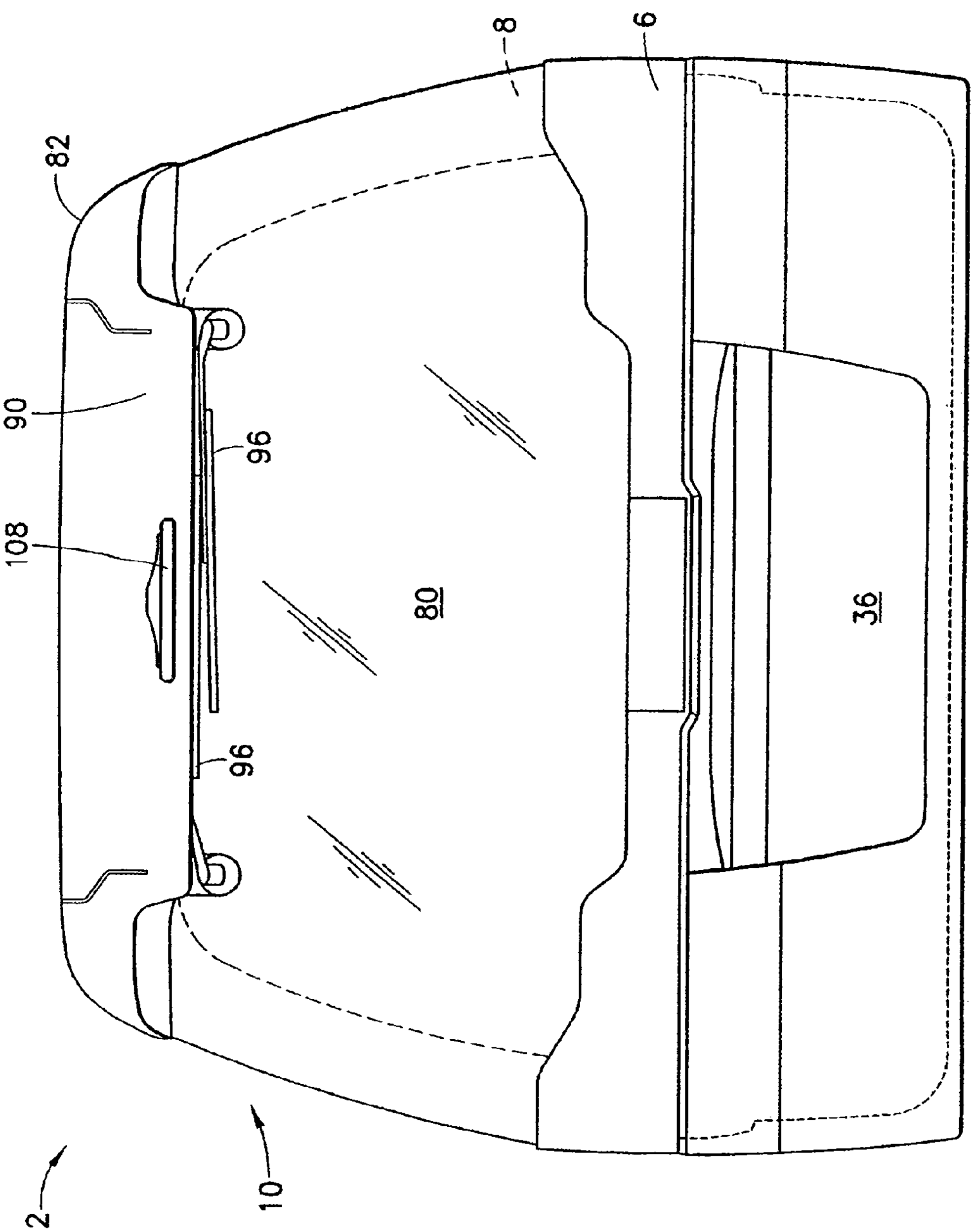
FIG. 1 is an external view of a vehicle door including a window assembly in accordance with the present invention.
Figure 2:
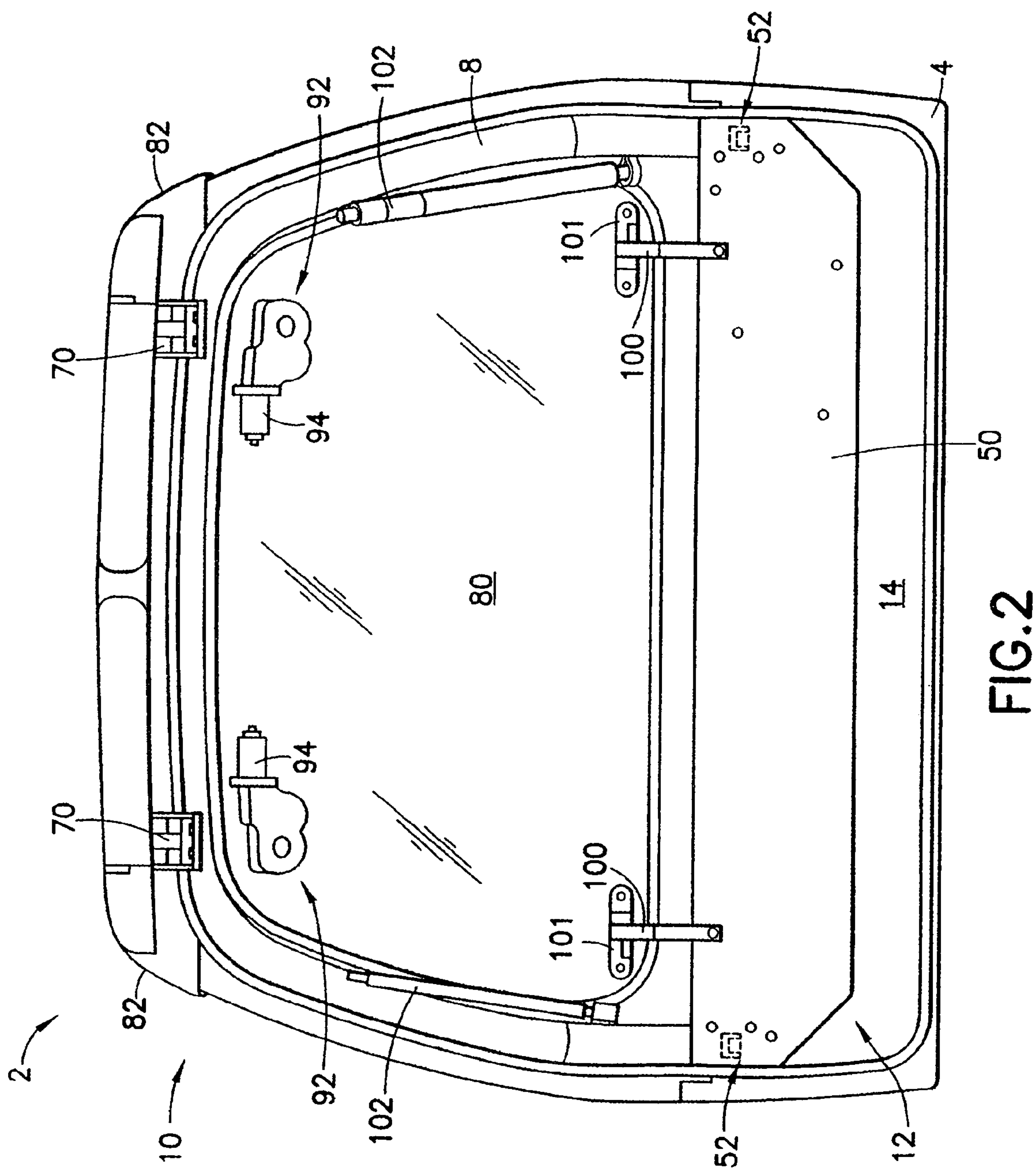
FIG. 2 is an internal view of the vehicle door of FIG. 1.
Figure 3:
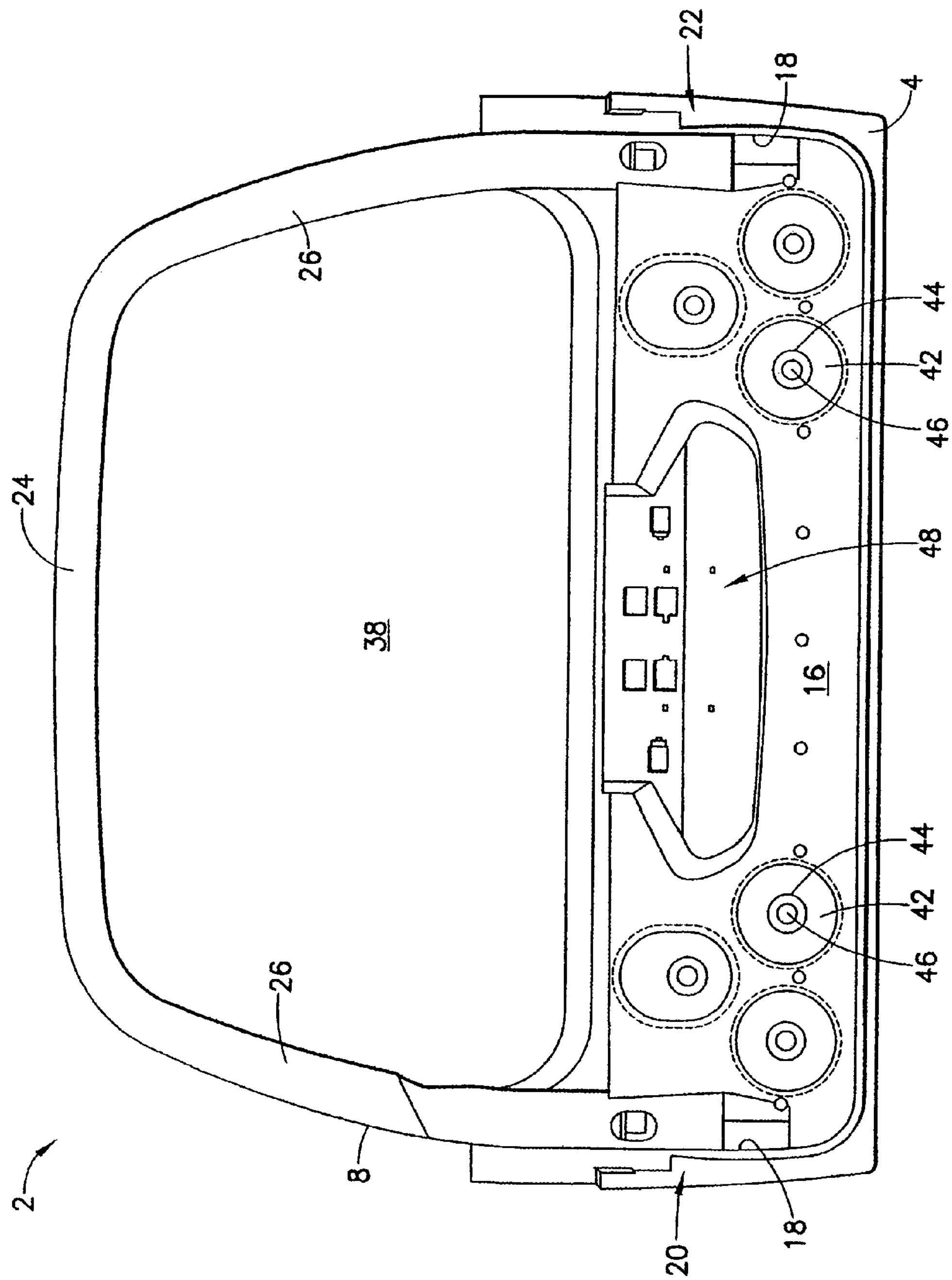
FIG. 3 is a front view of an inner side of an inner panel and a frame member of the vehicle door of FIG. 1.

For purposes of the description hereinafter, the terms "upper", "lower", "right", "left", "vertical", "horizontal", "top", "bottom", and derivatives thereof shall relate to the invention, as it is oriented in the drawing figures. However, it is to be understood that the invention may assume various alternative variations and step sequences except where expressly specified to the contrary. It is also to be understood that the specific devices and processes illustrated in the attached drawings and described in the following specification are simply exemplary embodiments of the invention. Hence, specific dimensions and other physical characteristics related to the embodiments disclosed herein are not to be considered as limiting. Additionally, in this disclosure, the terms "inner" and "outer" and "internal" and "external" are intended to define the side of an element that faces inward toward the passenger compartment of a vehicle or facing outward toward the ambient environment, respectively.

Referring to FIGS. 1–6, a vehicle door 2 in accordance with the present invention is shown. The vehicle door 2 is preferably in the form of a liftgate for attachment to the rear end of a motor vehicle, such as a mini-van, sport utility vehicle, hatchback car, and other similar vehicles. The door 2 is comprised generally of an inner panel 4, an outer panel 6, and a frame member 8 generally positioned between the inner and outer panels 4, 6. The door 2 is described hereinafter as being manufactured from aluminum. However, this is not to be limiting as other suitable materials may be used for the door 2 including steel, plastic, and combinations thereof, which may include aluminum. The frame member 8 provides the structural support for the door 2. The closure or panel functions of the door 2 are provided by the inner and outer panels 4, 6. Thus, the inner and outer panels 4, 6 are de-coupled from the structural function provided by the frame member 8.

As stated, the door 2 is preferably in the form of a liftgate used to enclose the rear end of a vehicle (not shown), such as a mini-van, as is known in the art. Specifically, the door 2 is used to enclose the rear storage compartment of the vehicle. The door 2 of the present invention generally further comprises a window assembly 10 supported by the frame member 8 and a locking hardware assembly 12 used to secure or lock the door 2 to the body of the vehicle, and further to lock the window assembly 10 to the body of the door. The locking hardware assembly 12 is generally carried on the inner panel 4 as described further hereinafter.

The inner panel 4 is generally rectangular-shaped and has an inner side 14 and an outer side 16. The inner side 14 generally faces inward toward the passenger compartment of the vehicle when the door 2 is mounted to the vehicle body. The outer side 16 of the inner panel 4 faces outward from the vehicle body when the door 2 is mounted to the vehicle body. The outer side 16 defines a pair of transversely extending recesses 18. The recesses 18 are located generally at opposite lateral ends 20, 22 of the inner panel 4. The inner panel 4 is preferably formed of aluminum, such as 6022T4E29 aluminum alloy, as designated by the Aluminum Association.

Figure 4:
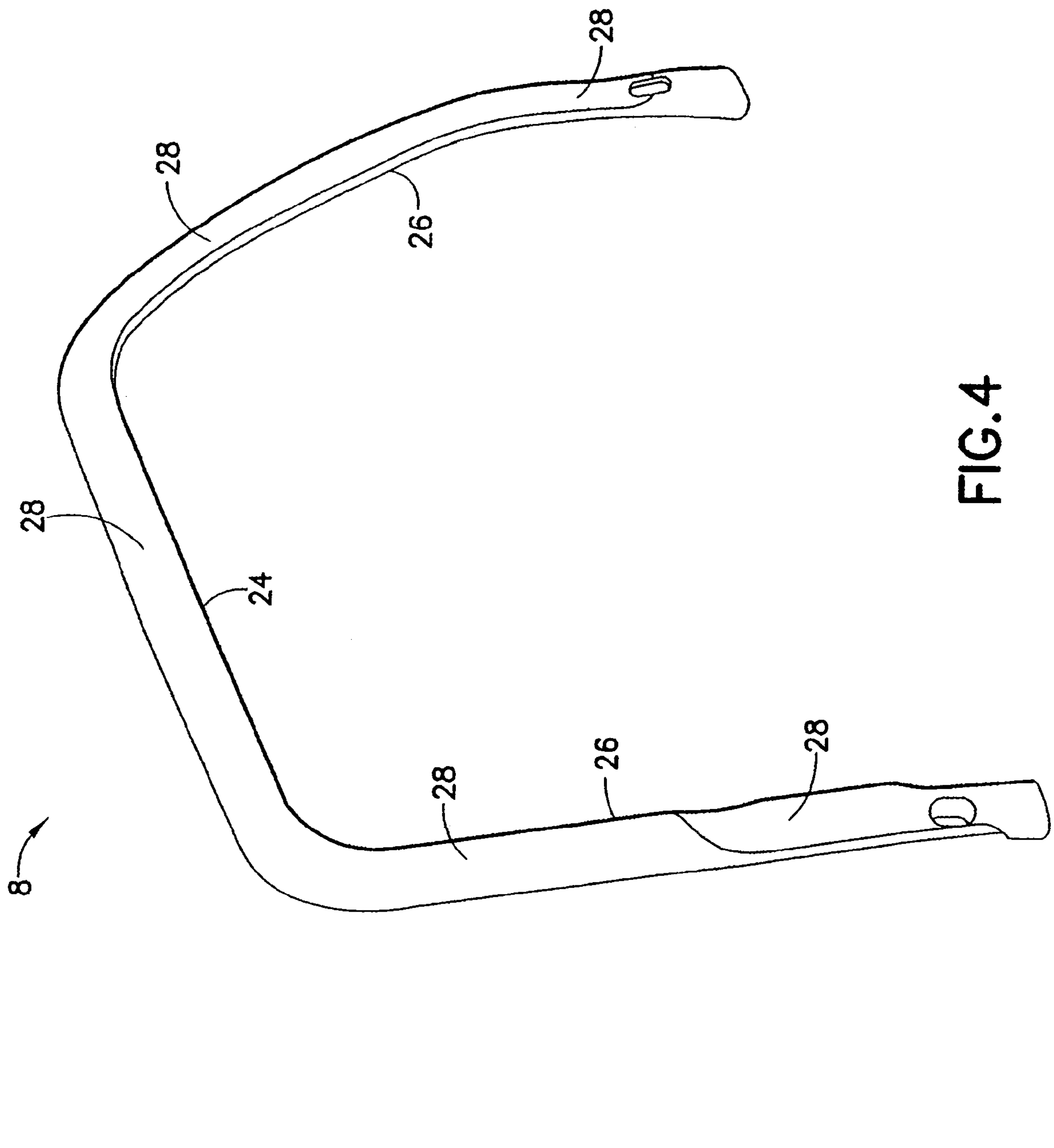
FIG. 4 is a perspective view of the frame member of the vehicle door of FIG. 1.
Figure 5:
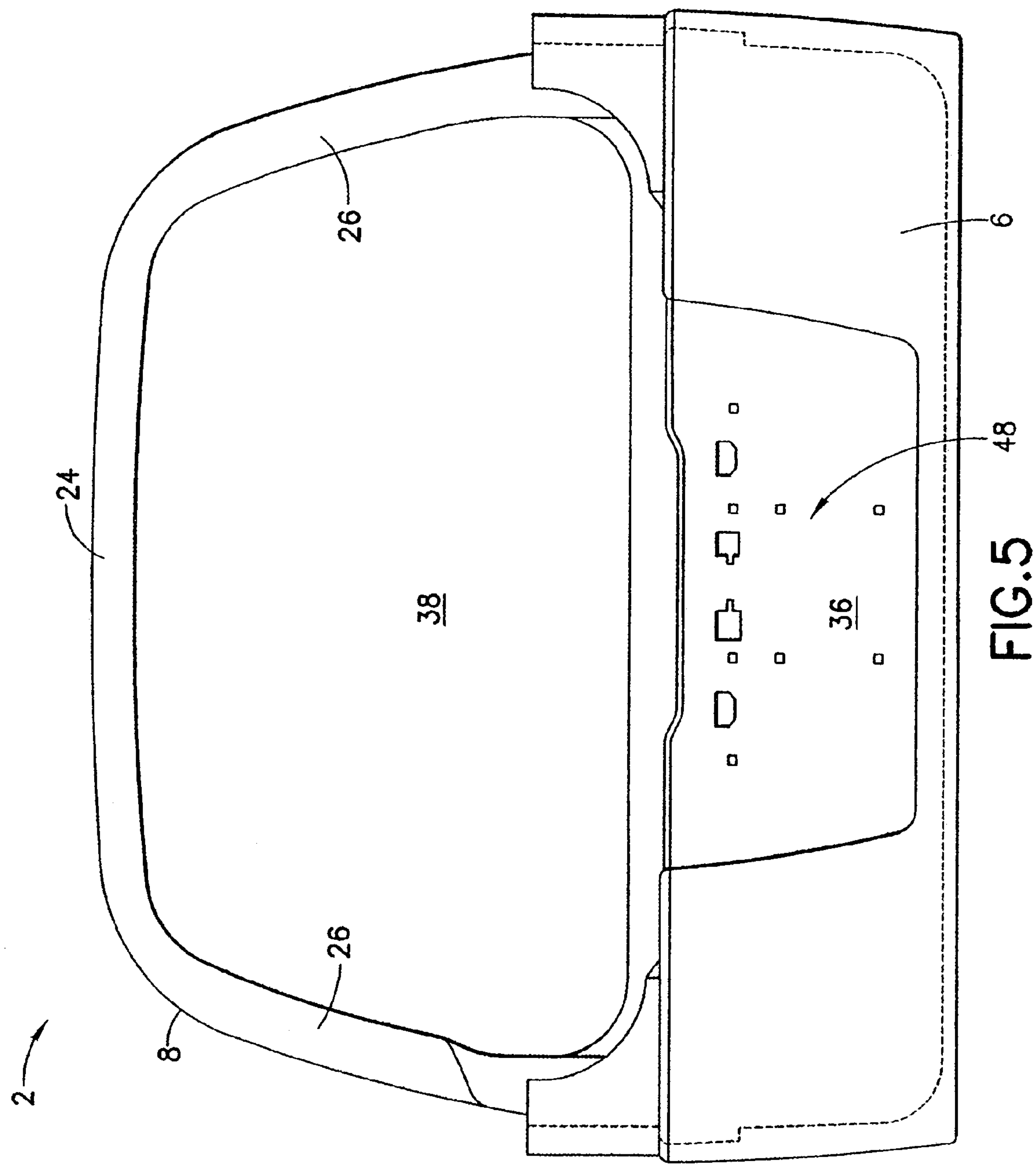
FIG. 5 is a front view of an outer side of an outer panel and the frame member of the vehicle door of FIG. 1.
Figure 6:
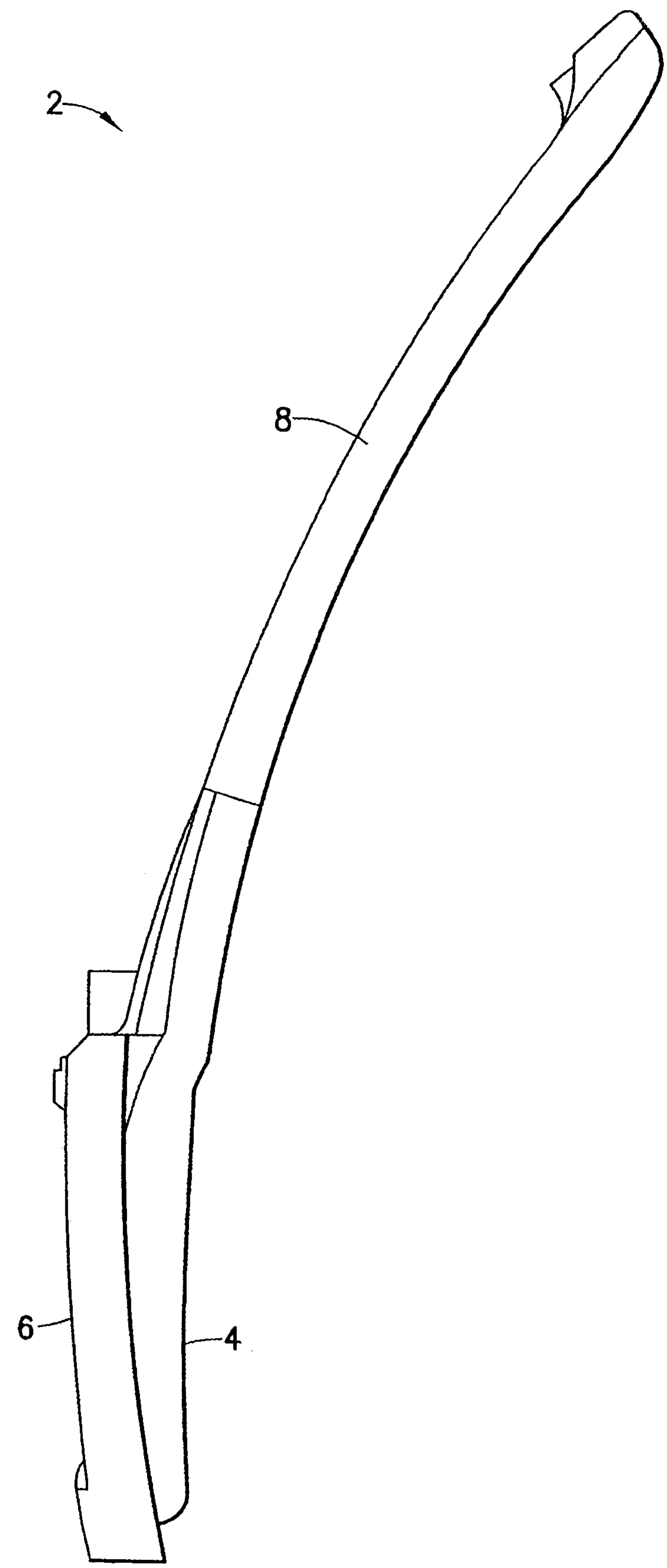
FIG. 6 is a side view of the vehicle door of FIG. 1.
Figure 7:
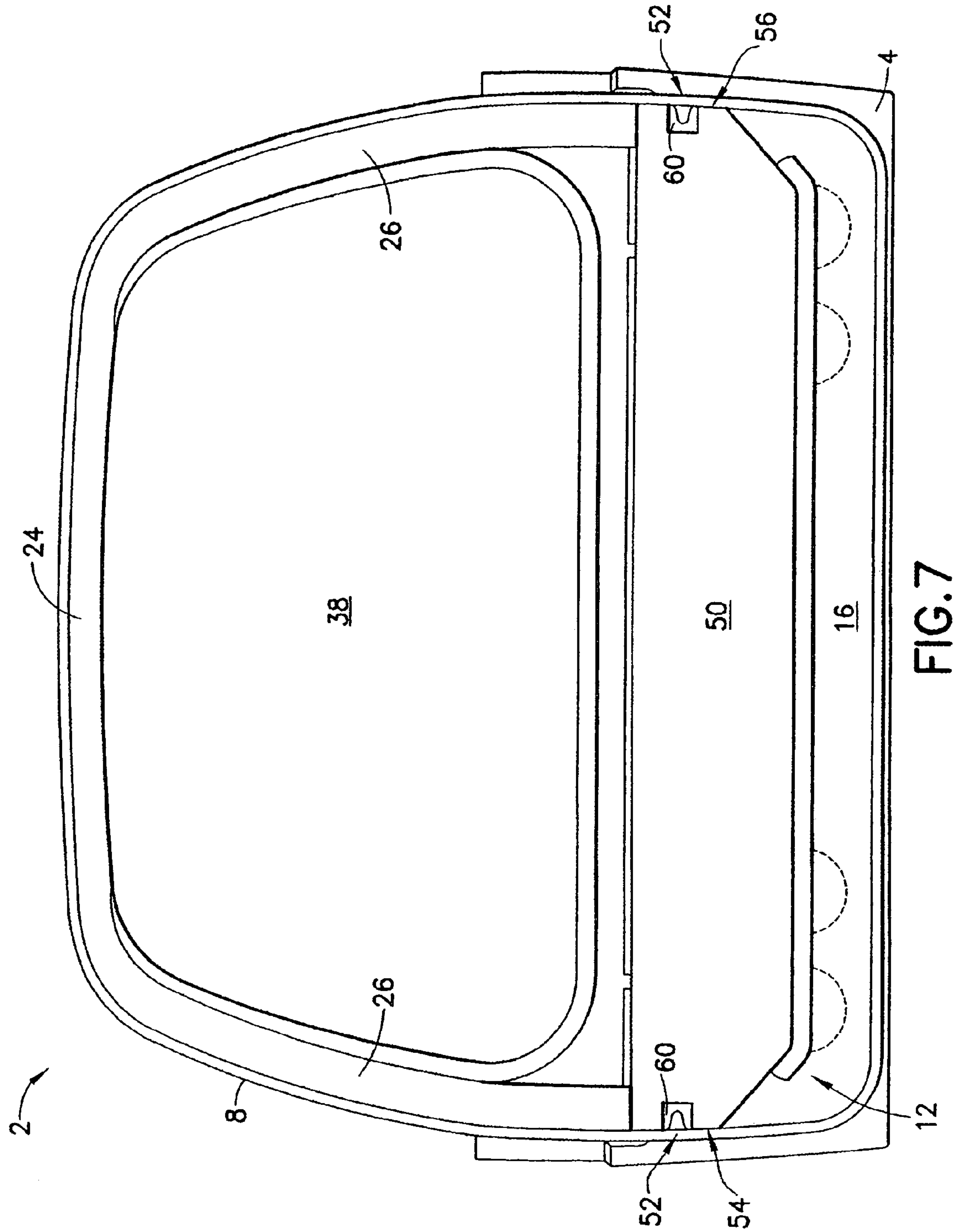
FIG. 7 is an internal view of the vehicle door of FIG. 1, showing a locking hardware assembly attached to the inner side of the inner panel and having the window assembly of the vehicle door removed for clarity.

The frame member 8 is preferably in the form of a hydroformed aluminum tube. The frame member 8 is comprised by a cross member 24 and a pair of spaced apart legs 26 extending from the cross member 24. As shown in FIG. 4, the hydroformed aluminum tube comprising the frame member 8 defines different cross sectional profiles 28 along the length of the tube, which provides mounting locations for various components to be attached to the frame member 8, as discussed further hereinafter.

The outer panel 6 is generally rectangular-shaped in a similar manner to the inner panel 4. The outer panel 6 has an inner side 34 and an outer side 36. The inner side 34 generally faces inward toward the passenger compartment of the vehicle when the door 2 is mounted to the vehicle body. The outer side 36 of the outer panel 36 faces outward from the vehicle body when the door 2 is mounted to the vehicle body. The outer panel 6 is preferably formed of aluminum, such as 6022T4E29 aluminum alloy as designated by the Aluminum Association. The inner and outer panels 4, 6 may be formed together in a single manufacturing step as discussed further herein.

The legs 26 of the frame member 8 are received in the recesses 18 formed in the outer side 16 of the inner panel 4. Preferably, the legs 26 are fixed in the recesses 18 by conventional means. Such conventional means may include, for example, mechanical fasteners, welds, adhesives, and combinations thereof. As illustrated, the inner panel 4 extends only part way up the legs 26 of the frame member 8. The outer panel 6 is connected to the inner panel 4 such that the frame member 8 is located between the inner and outer panels 4, 6. Thus, the inner side 34 of the outer panel 6 faces the legs 26 of the frame member 8 and the outer side 16 of the inner panel 4. The outer panel 6 also extends only part way up the legs 26 of the frame member 8, as illustrated. Thus, the frame member 8 forms the entire upper portion of the door 2. The inner panel 4, outer panel 6, and frame member 8 define a window opening 38 of the door 2, which is covered by the window assembly 10, as discussed hereinafter. The outer panel 6 is connected to the inner panel 4 along the lateral edges and bottom edge of the respective panels 4, 6, preferably by hemmed connections. Spot welding may be used to connect the top edges of the inner and outer panels 4, 6 to generally form the vehicle door 2.

Figure 8:
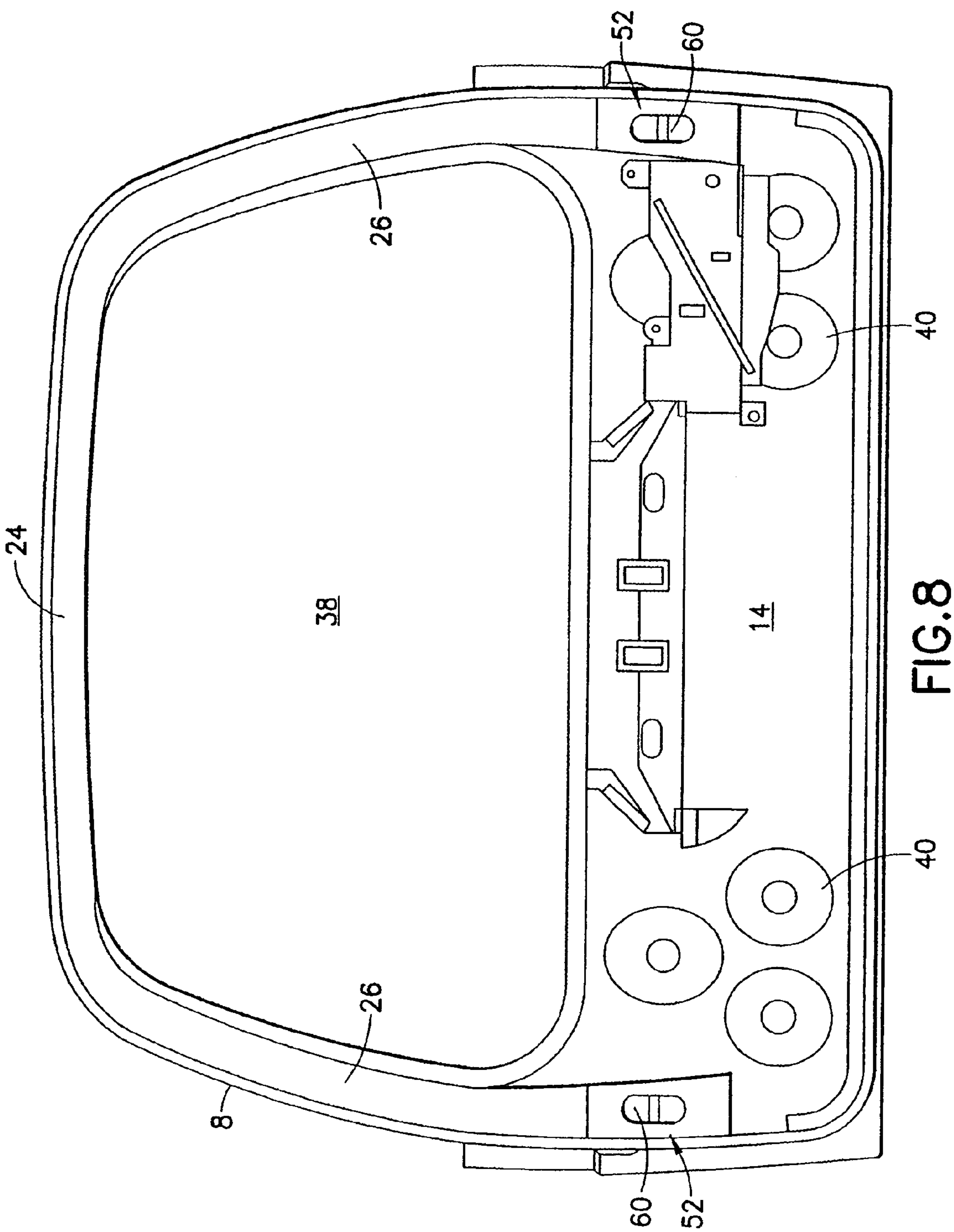
FIG. 8 is an internal view of the vehicle door of FIG. 7, with a hardware carrier of the locking hardware assembly removed to show door locking mechanisms of the assembly.
Figure 9:
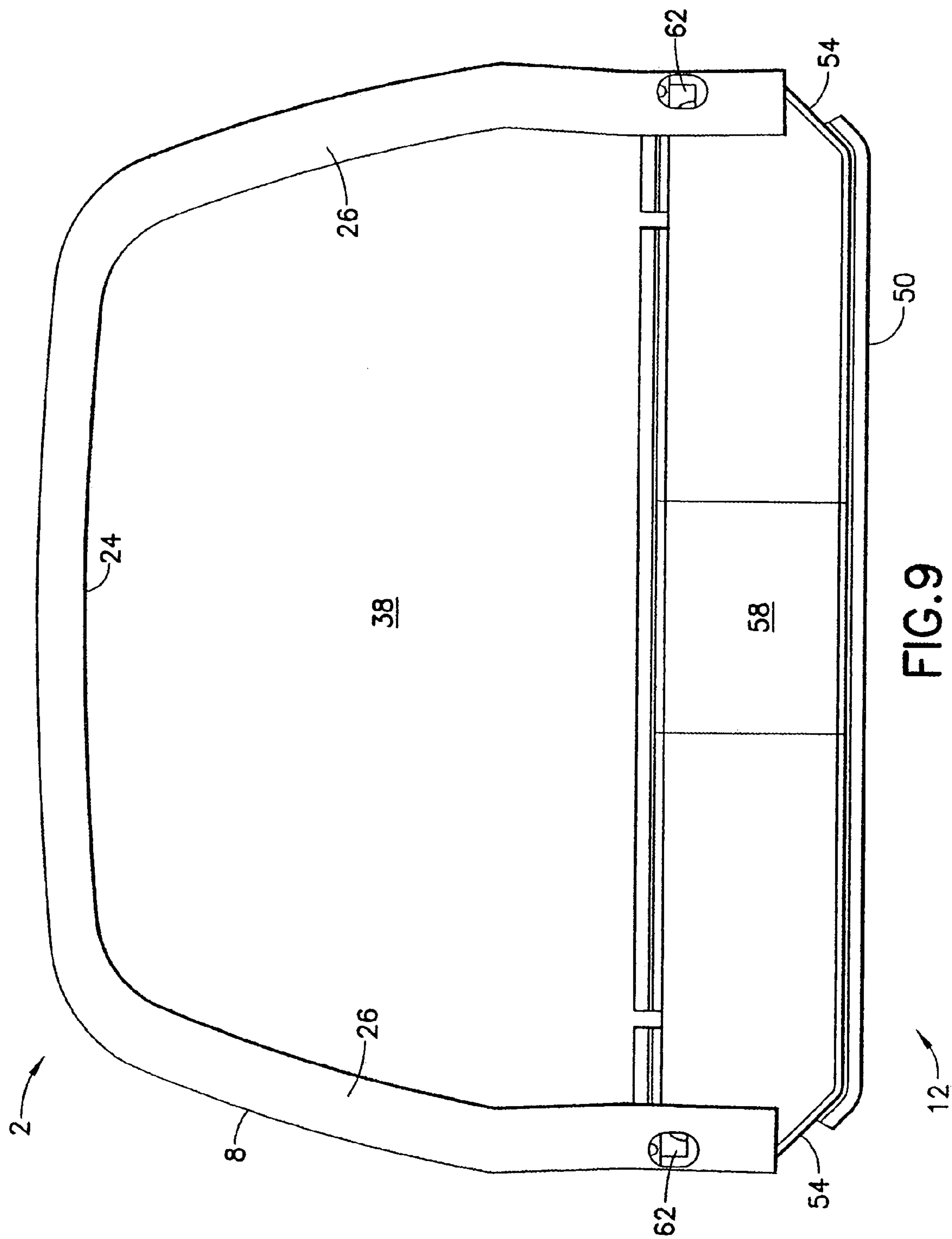
FIG. 9 is an external view of the vehicle door of FIG. 7, with the inner panel removed for clarity.
Figure 10:
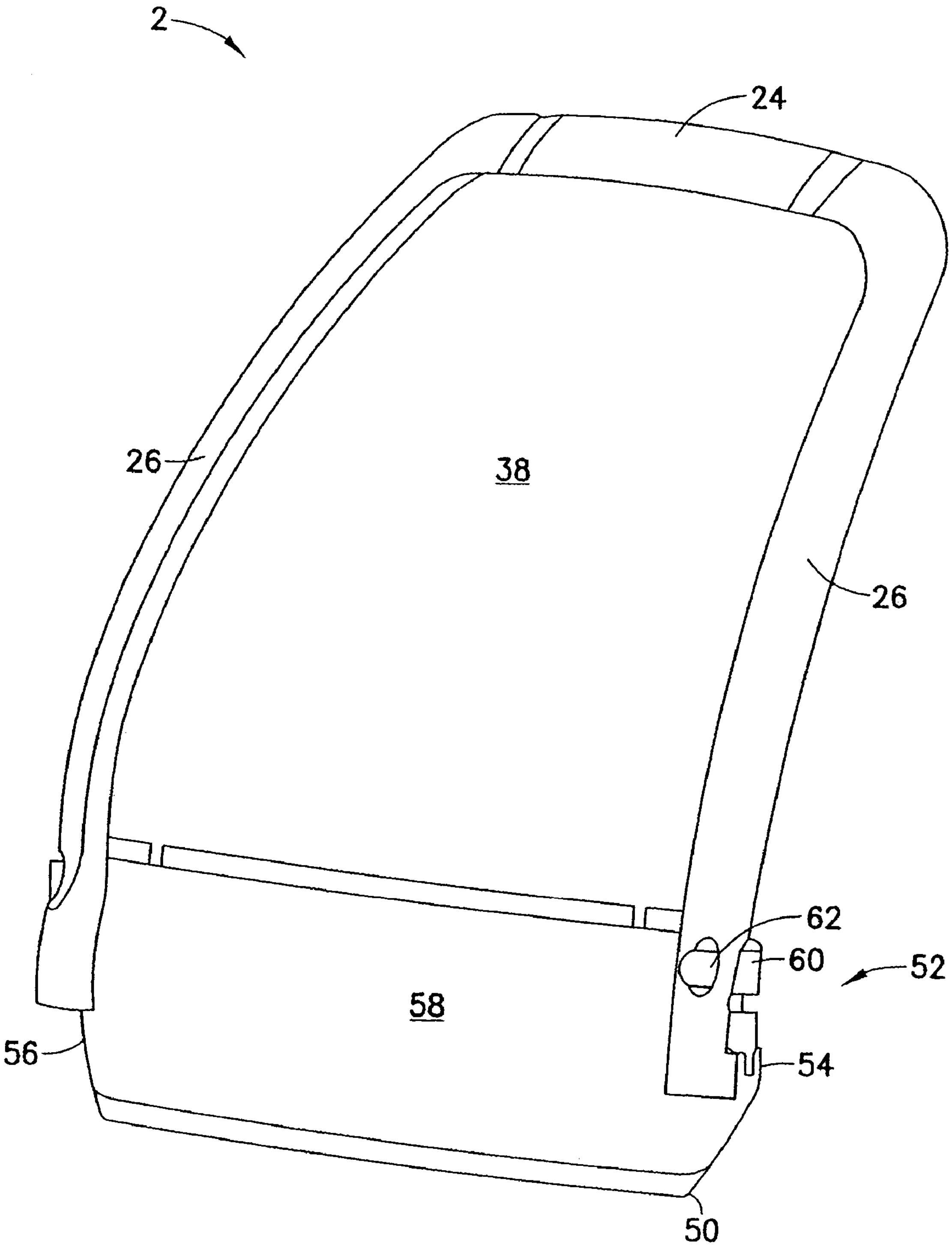
FIG. 10 is a perspective view of the locking hardware assembly and frame member shown in FIG. 9.

The inner panel 4 is preferably formed with one or more depressions 40 (shown in FIG. 8) in the inner side 14, which form one or more raised portions 42 on the outer side 16 of the inner panel 4. The raised portions 42 each have a contact surface 44 proximate to the inner side 34 of the outer panel 6. Cushioning members 46 are positioned between the respective contact surfaces 44 and the inner side 34 of the outer panel 6 to interconnect the inner and outer panels 4, 6. The cushioning members 46 are preferably in the form of anti-flutter adhesive drops, as discussed further hereinafter. The depressions 40 in the inner panel 4 enhance the strength and rigidity of the inner panel 4, and support the outer panel 6 when the door 2 is assembled. The inner and outer panels 4, 6 may also be connected by conventional means in a license plate area 48 of the door 2, such as by mechanical fasteners, welds, adhesives, and combinations thereof.

The overall thickness of the door 2 at its widest point is approximately 35 millimeters in accordance with the construction of the inner and outer panels 4, 6 and frame member 8 described hereinabove. This thickness dimension is in contrast to typical prior art liftgates, which ordinarily have a thickness in the range of 130–150 millimeters at their deepest point and weigh approximately twice as much as the door 2 of the present invention. The small depth or cross sectional profile of the door 2 frees up additional space in the rear storage compartment of the vehicle and the lighter weight makes the door 2 easier to manipulate during opening and closing. The savings in weight further helps to improve the fuel economy of the vehicle.

Referring to FIGS. 7–10, the locking hardware assembly 12 of the door 2 is connected to the inner side 14 of the inner panel 4. The locking hardware assembly 12 is comprised generally of a hardware carrier 50 and a pair of door locking mechanisms 52 mounted to the hardware carrier 50. The hardware carrier 50 may be in the form of a sheet or plate and may have depressions or recesses formed in the sheet or plate for mounting elements of the locking hardware assembly 12 thereto and for increased strength and rigidity. The door locking mechanisms 52 are mounted at opposite lateral ends 54, 56 of the hardware carrier 50, preferably on a side 58 of the hardware carrier 50 facing the inner side 14 of the inner panel 4. The hardware carrier 50 is preferably connected fixedly to the inner side 14 of the inner panel 4 by mechanical fasteners (i.e., screws). Two locking mechanism 52 are preferred to provide redundancy and safety. For example, in the event of a rear end collision involving the door 2, two door locking mechanisms 52 provide redundancy in preventing the door 2 from opening as a result of the collision. The use of two door locking mechanisms 52 also provides an extra layer of defense against break-ins to the vehicle.

The door locking mechanisms 52 each include a catch 60. The catches 60 of the door locking mechanisms 52 are engaged by respective latches (i.e., latch loops, for example—not shown) mounted on the vehicle body to lock the door 2 to the vehicle body in a known manner. Uniquely, however, the catches 60 of the door locking mechanisms 52 include wedges 62, which are connected to the frame member 8, in particular the legs 26 of the frame member 8, and add strength and rigidity to the door 2 in case of a rear impact, or attempted unauthorized entry into the rear storage compartment of the vehicle. The locking hardware assembly 12 may be pre-assembled and pre-tested for proper operation prior to being mounted to the door 2, which improves the quality and reliability of door 2. The modular nature of the locking hardware assembly 12 also makes maintenance of the locking hardware assembly 12 easier should this be necessary, for example, at the dealer level.

Figure 11:
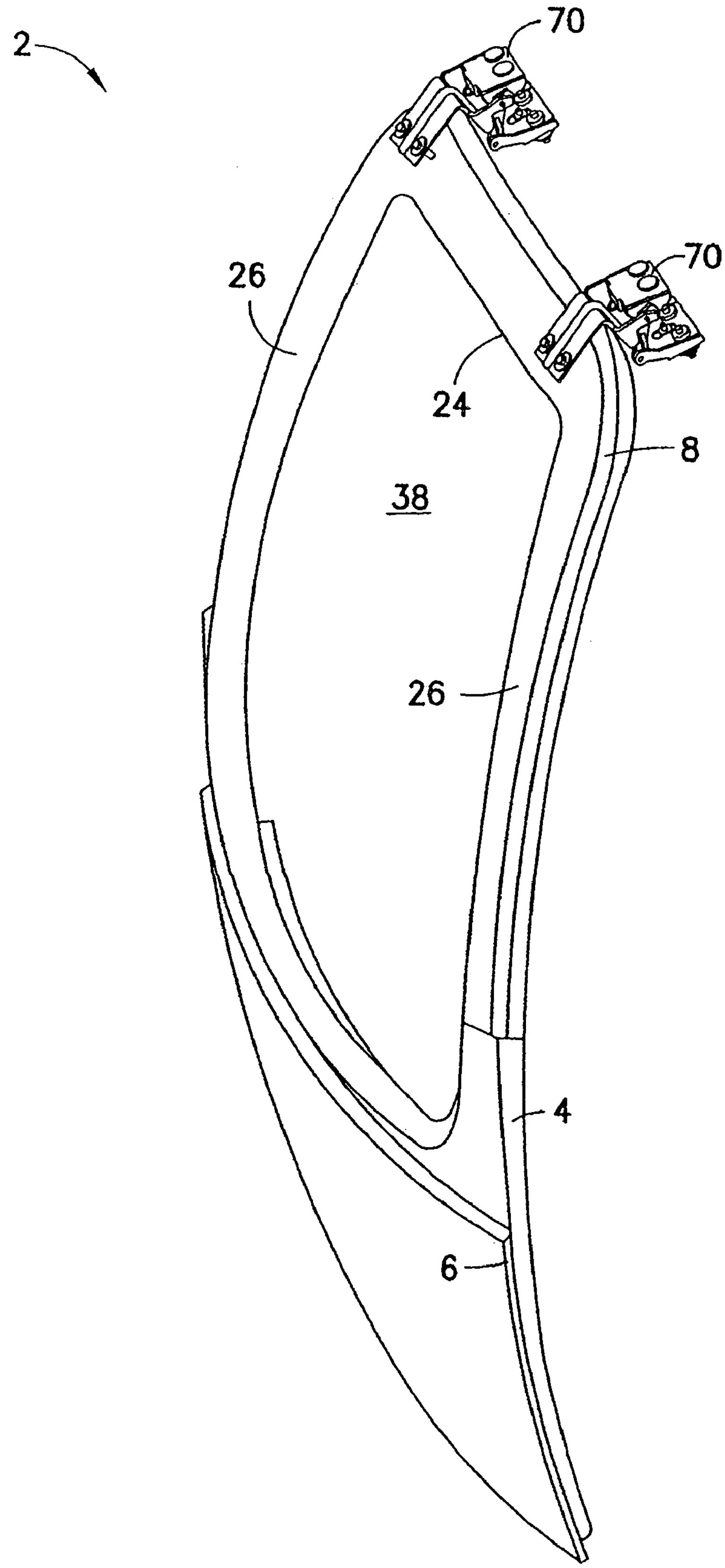
FIG. 11 is a perspective view of the vehicle door of FIG. 1, showing a pair of hinges connected to the frame member and having the window assembly of the vehicle door removed for clarity.
Figure 12:
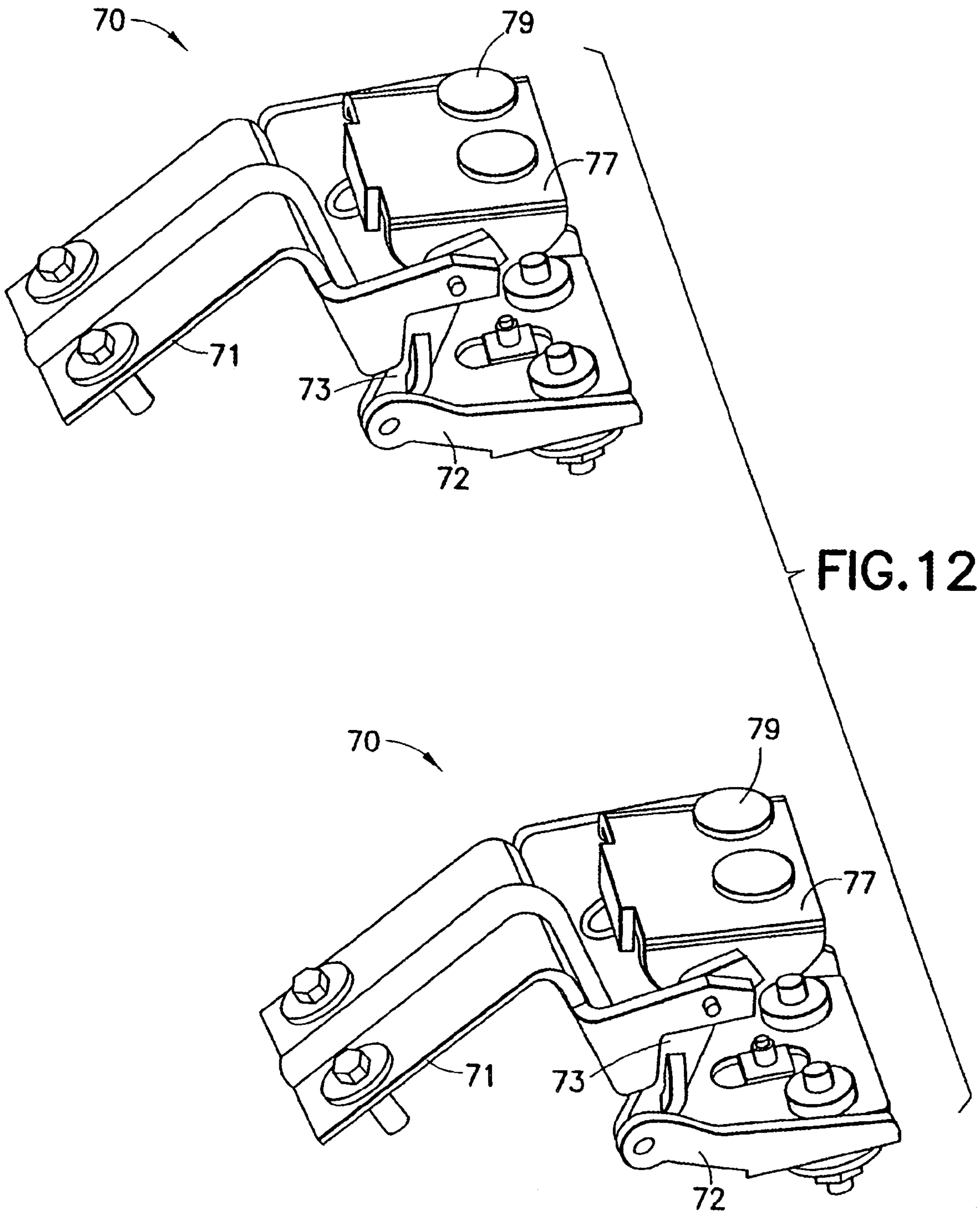
FIG. 12 is a perspective view of the hinges of FIG. 11 shown detached from the vehicle door of FIG. 11.
Figure 13:
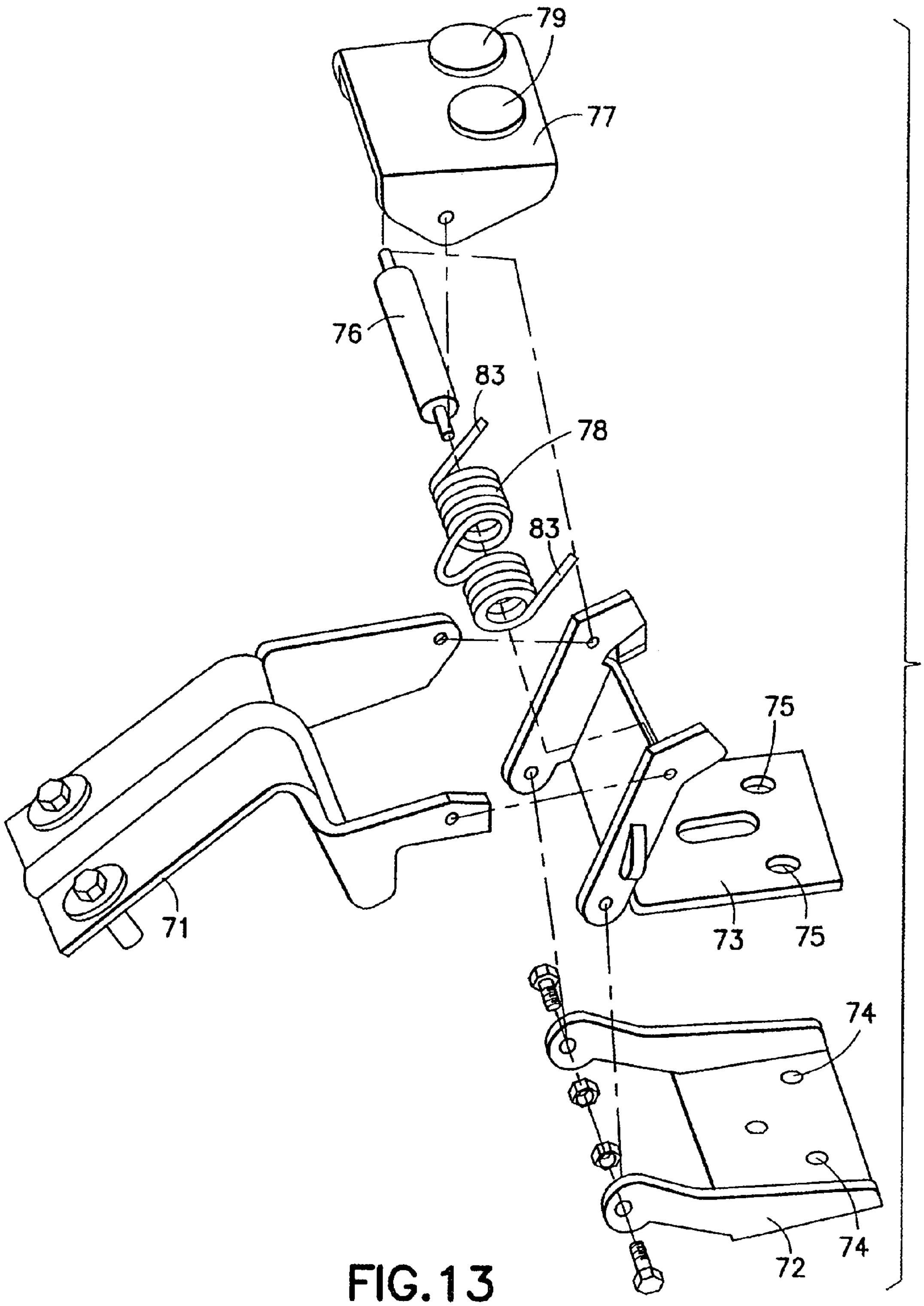
FIG. 13 is an exploded perspective view of one of the hinges shown in FIG. 12.
Figure 14:
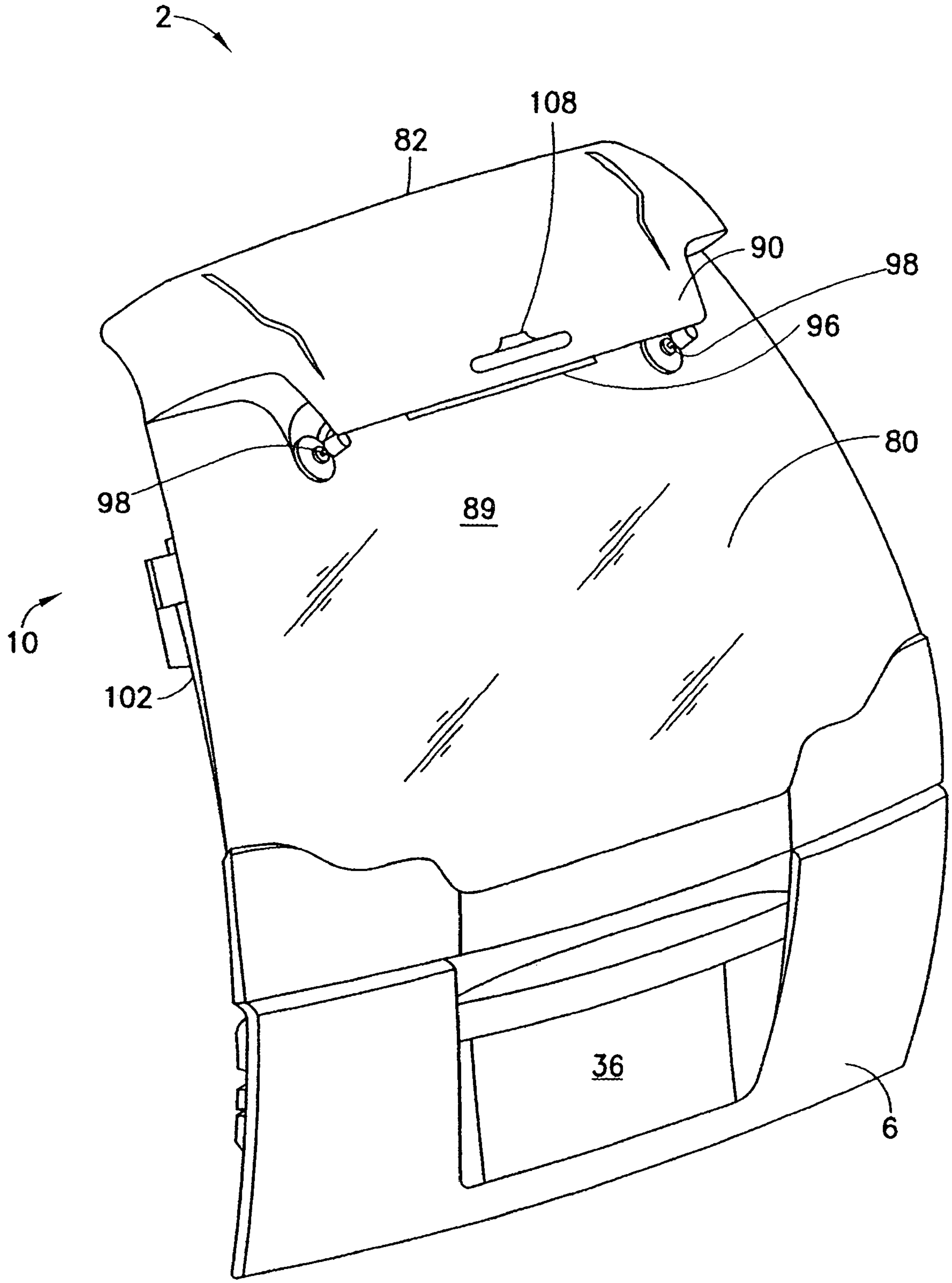
FIG. 14 is a perspective view of the vehicle door of FIG. 1, showing the window assembly supported by the vehicle door.

Referring to FIGS. 11–13, the door 2 preferably includes a pair of double-pivoting hinges 70 for mounting the door 2 to the body of the vehicle. However, the pair of hinges 70 may be replaced by one or two conventional single-acting (i.e., single pivot axis) hinge in accordance with the present invention. The hinges 70 are preferably double-pivoting hinges, which permit independent pivotal movement by the window assembly 10 and the door 2. Generally, the hinges 70 perform two functions for the door 2. First, as stated, the hinges 70 mount the door 2 to the vehicle body and permit the door 2 to pivot with respect to the vehicle body to open and close the door 2. Second, the hinges 70 mount the window assembly 10 to the frame member 8 and permit the window assembly 10 to pivot independent of the door 2, which permits access to the rear storage compartment in the vehicle body without opening the door 2.

The hinges 70 each include a first member 71 configured to be mounted to the cross member 24 of the frame member 8, preferably by mechanical fasteners (i.e., screws), as shown. The first members 71 secure the hinges 70 to the frame member 8. The hinges 70 each further include a second member 72 connected to the first member 71 by a linkage 73. The second members 72 in the hinges 70 are generally configured to connect or mount the door 2 to the vehicle body. The second member 72 and linkage 73 in each of the hinges 70 are preferably pivotally connected by mechanical fasteners (i.e., nuts and bolts, for example), as illustrated. When the window assembly 10 is to be mounted to the vehicle body, the second members 72 of the hinges 70 are initially mounted to the vehicle body with, for example, mechanical fasteners (not shown) that cooperate with openings 74 formed in the base of the second members 72. Once the second members 72 are mounted to the vehicle body, the linkages 73 in the hinges 70 are pivoted into engagement with their corresponding second member 72. The linkage 73 in each of the hinges 70 defines openings 75 in the base of the linkage 73 for receiving the same mechanical fasteners (i.e., bolts, for example) used to connect the second members 72 to the vehicle body. Additional mechanical fasteners (i.e., nuts—not shown) are then used to fixedly connect the linkage 73 and second member 72 in each of the hinges 70. Thus, the base of the linkage 73 is fixedly secured to the base of the second member 72 in each of the hinges 70. The first member 71 is pivotally connected to the linkage 73 by a pin 76 in each of the hinges 70. Hence, the first member 71 is pivotally connected to the second member 72 in each of the hinges 70 via the linkage 73.

The hinges 70 each further include a third member 77 connected pivotally by the pin 76 to the linkage 73 and, hence, the second member 72. The pin 76 enables independent pivotal movement by the first member 71 and the third member 77 about the same pivot axis (i.e., pin 76) in each of the hinges 70. The third members 77 are generally configured to support the window assembly 10, as discussed hereinafter. Thus, the first and third members 71, 77 are pivotally connected to the second member 72 through the linkage 73 in each of the hinges 70 and pivot independently of each other about the same pivot axis defined by the pin 76. Torsion springs 78 may be incorporated into the hinges 70, preferably coaxial to the pins 76, which assist in opening the window assembly 10, as discussed hereinafter. Additionally, the third member 77 in each of the hinges 70 is preferably formed with studs 79 for supporting additional elements of the window assembly 10, as also discussed hereinafter.

Referring to FIGS. 14–18, the window assembly 10 is attached to the frame member 8 by the hinges 70. Specifically, the window assembly 10 is supported by the independently pivotal third members 77 of the hinges 70. The window assembly 10 is generally comprised of a glass rear window 80 and a valance 82. The window 80 is preferably bonded to the valance 82. The valance 82 and window 80 may be further connected by studs (not shown), which may be molded into the valance 182 and used to secure the connection between the window 80 and valance 82. The valance 82 is preferably located at the top or upper end of the window 80. The window assembly 10, as stated, is supported in the hinges 70 by the third members. In particular, the valance 82 is mounted to the third members 77 of the hinges 70 by the studs 79 (i.e., mechanical fasteners). The studs 79 may be integrally formed with the third member 77. The valance 82 provides the support structure for supporting the window 80 and several other elements of the window assembly 10, which are discussed hereinafter. The valance 82 may be formed, for example, of plastic and may be reinforced with metal structural members.

The torsion springs 78 incorporated into the hinges 70 (i.e., substantially coaxial to the pivot axis of the third members 77) provide the lift assist function for the window assembly 10. Specifically, one part or portion 88 (i.e., ends or legs) of the torsion springs 78 acts against the linkage 73 and, hence, second member 72 in each of the hinges 70 and another part or portion 84 (i.e., middle leg) 84 of the torsion springs 78 acts against the third member 77 to provide the desired lift assist function. Traditional lift assist mechanisms such as those used in prior art liftgates having a flip glass are not necessary in the door 2. The lift assist function for the window assembly 10 is provided effectively by the torsion springs 78 incorporated into the hinges 70.

Figure 18:
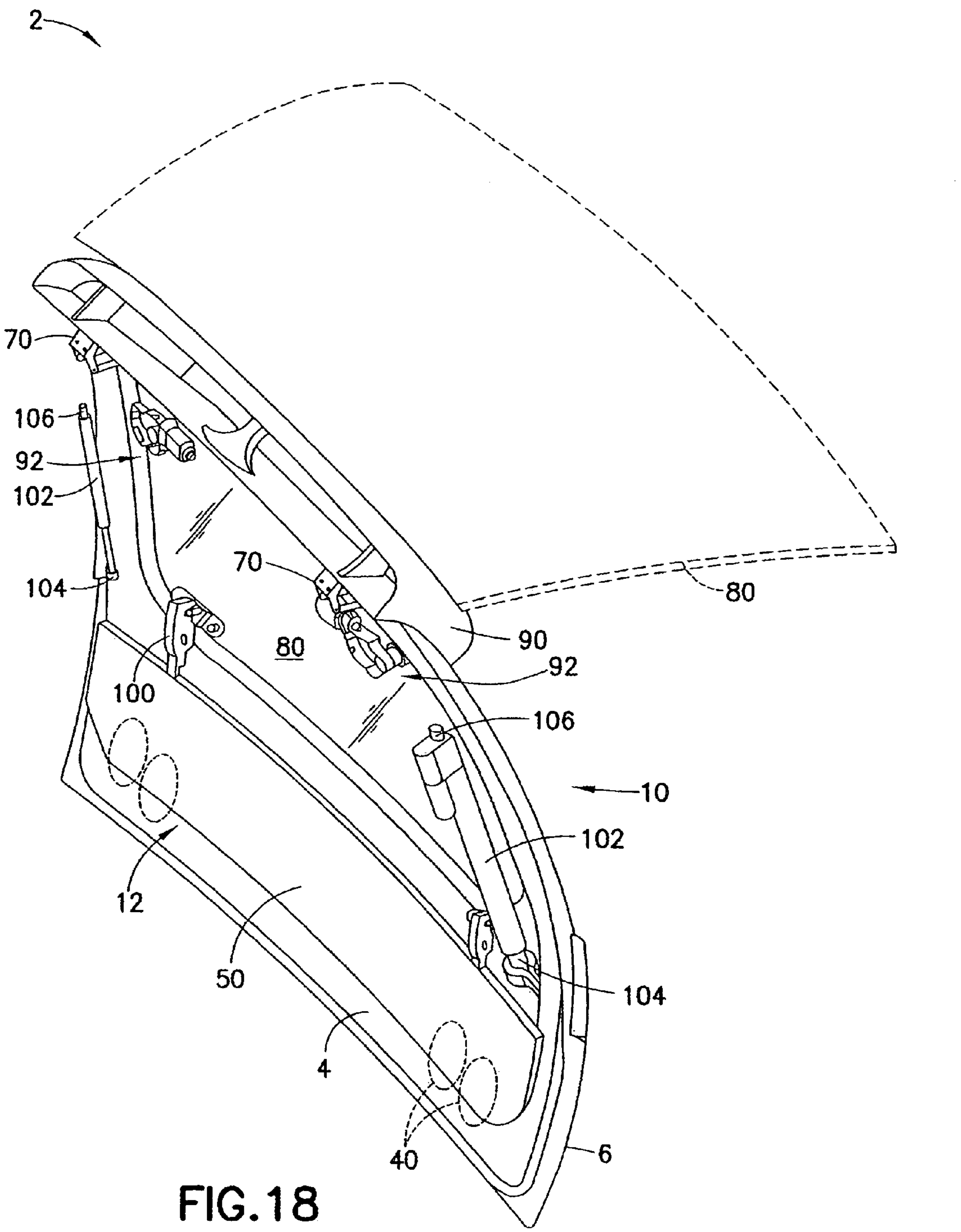
FIG. 18 is a perspective view of the vehicle door of FIGS. 14 and 15, showing a window of the window assembly in an open position.

The window 80 is configured to cover the window opening 38 defined by the frame member 8 and the inner and outer panels 4, 6. A sealing gasket 86 may be provided on an inner side 88 of the window 80 for sealing against the frame member 8 and the outer side 36 of the outer panel 6 when the window 80 is in the closed position. The gasket 86 provides a weather-tight seal for the window 80. FIG. 18 shows the window assembly 10 in an open position with the window 80 pivoted upward allowing access through the window opening 38 to, for example, the rear storage area of a mini-van.

The valance 82 is generally located at the top or upper end of the window 80 on an outer side 89 of the window 80. The valance 82 preferably includes an integrally formed air deflector 90. The air deflector 90 generally extends downward along the window 80. The air deflector 90, in addition to performing an air-deflecting function for the window assembly 10, also serves additional functions as discussed hereinafter.

The window assembly 10 preferably further includes a pair of rear window wiper motor and blade assemblies 92, which are located at the upper end of the window 80, preferably at the top corners of the window 80. The wiper motor and blade assemblies 92 are each comprised of a wiper motor 94 and a wiper blade 96. In one embodiment, the wiper motors 94 are located on the inner side 88 of the window 80 and the wiper blades 96 are located on the outer side 89 of the window 80. The wiper motors 94 and wiper blades 96 are preferably connected through the window 80. Further, the wiper motor and blade assemblies 92 are mounted to the valance 82 through the window 80. The valance 82 provides the structural support for the wiper motor and blade assemblies 92. In particular, the wiper motors 94 have motor shafts 98 that extend through openings in the window 80, and preferably through openings in the valance 82. The motor shafts 98 are preferably secured to the valance 82 with mechanical fasteners, which further secures the window 80 and valance 82 in a fixed relationship. Appropriate connections are provided to the electrical harness of the vehicle for providing power to the wiper motors 94.

Figure 16:
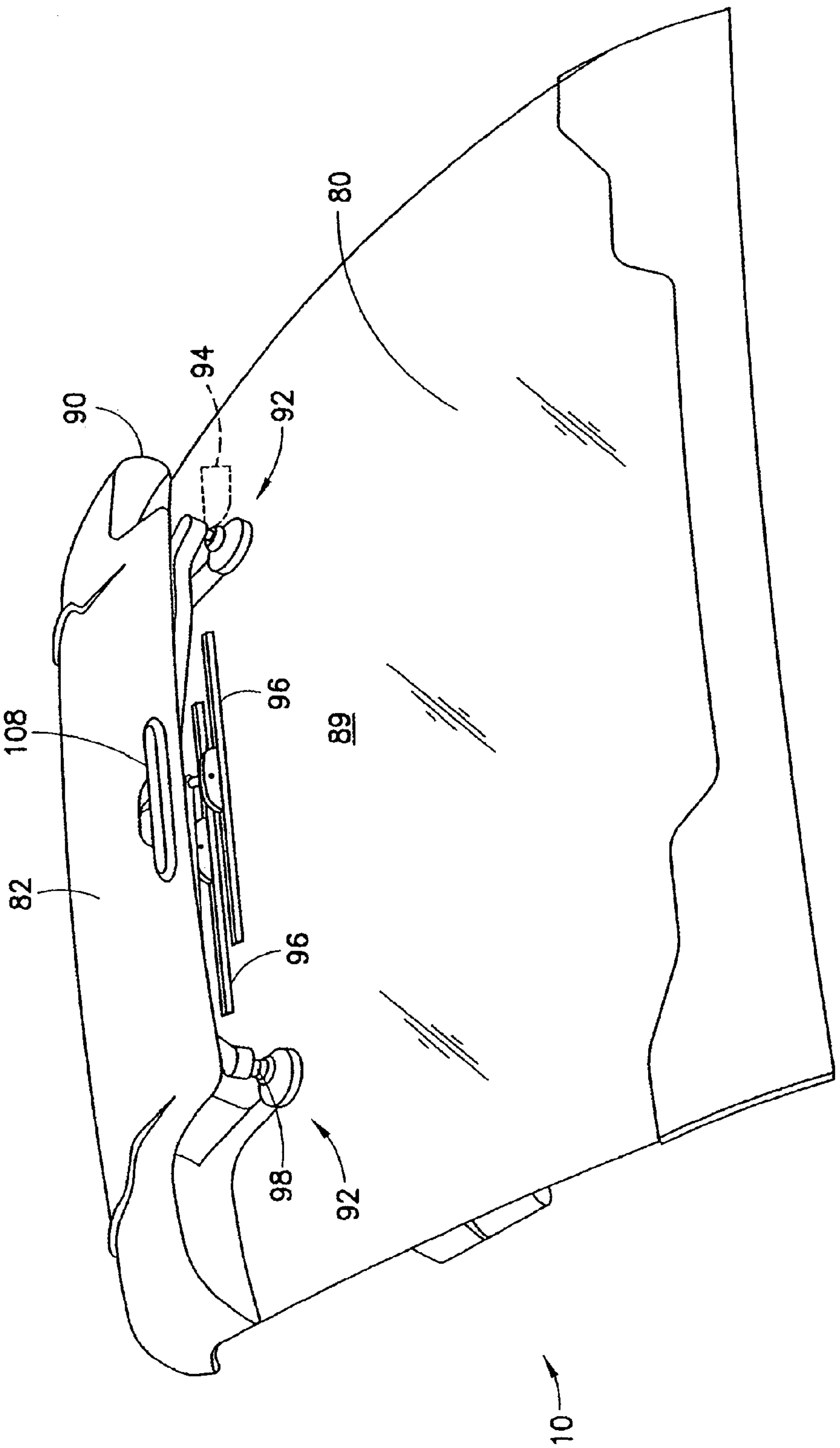
FIG. 16 is a perspective view of the external side of the window assembly of FIGS. 14 and 15.
Figure 17:
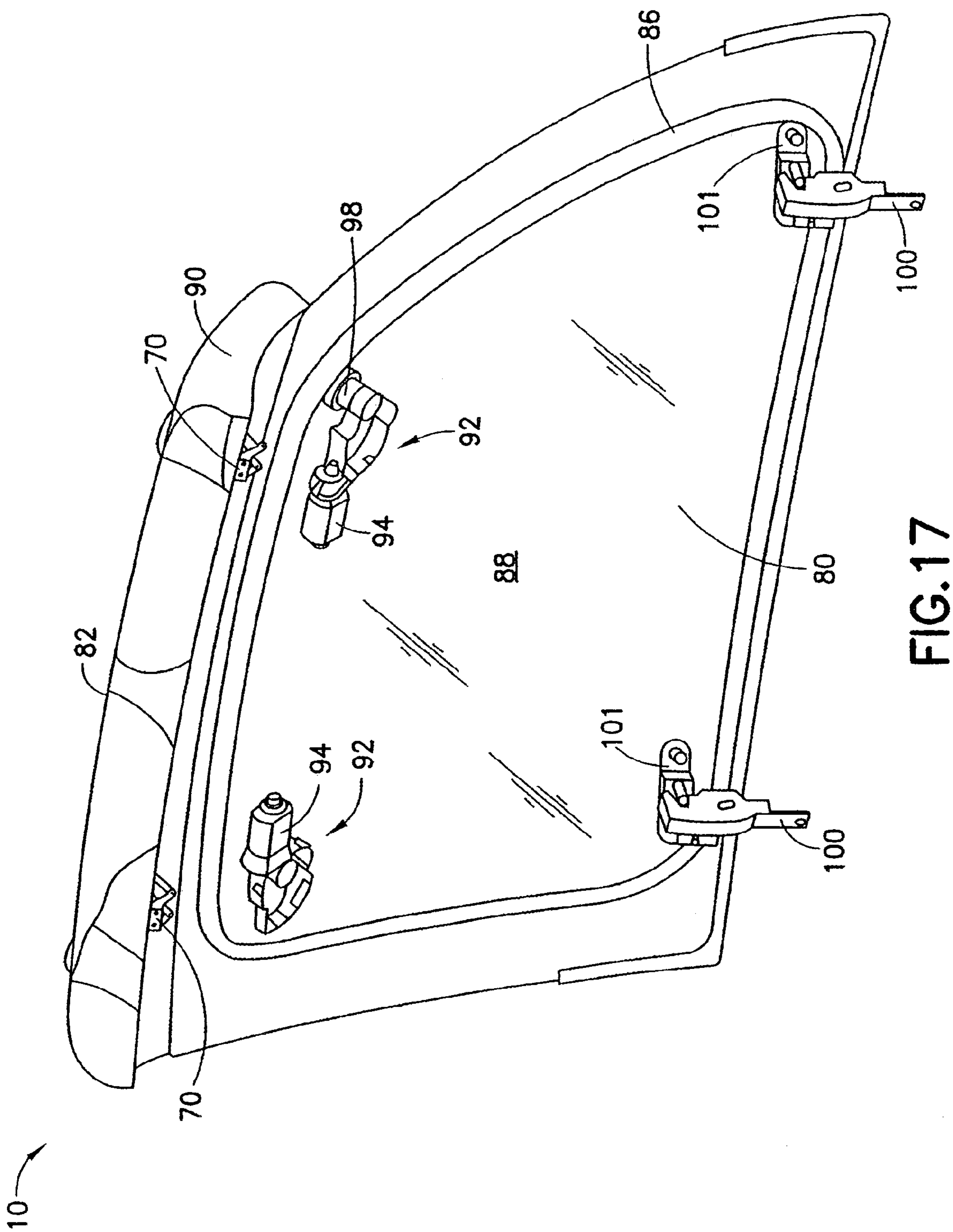
FIG. 17 is a perspective view of the internal side of the window assembly of FIGS. 14 and 15.

In an alternative embodiment, as schematically illustrated in FIG. 16, the wiper motor and blade assemblies 92 may be mounted directly to the valance 82 and located between the valance 82 and the outer side 89 of the window 80 (i.e., mounted on an inside side or surface of the valance 82 window 80). In this configuration, the motor shafts 98 of the wiper motors 94 do not extend through the window 80. The wiper motor and blade assemblies 92 in this embodiment are located entirely externally to the window 80, again with appropriate connections to the electrical harness of the vehicle for providing power to the wiper motors 94. In either embodiment discussed hereinabove, the valance 82 has nozzles and tubing (not shown) to provide washer fluid to the outer side 88 of the window 80.

The wiper blades 96 are mounted for pivotal movement on the motor shafts 98 in a known manner. Preferably, the wiper motor and blade assemblies 92 are configured such that the arcs of the wiper blades 96 are out of phase with each other, but result in nearly 100% (i.e., over 90%) glass area cleaning on the window 80. Additionally, the location of the wiper motor and blade assemblies 92 provides advantages when opening the window assembly 10 independently from the door 2. In particular, the mass of the wiper motor and blade assemblies 92 is located near the fulcrum of the window assembly 10 (i.e., proximate to the hinges 70), which reduces the effort required to pivot the window assembly 10 upward to an open position. Thus, as indicated previously, lift assist mechanisms such as those used in prior art liftgates having a flip glass are not necessary. The lift assist function for the window assembly 10 is effectively provided by the torsion springs 78 incorporated into the hinges 70 and the proximate location of the wiper motor and blade assemblies 92 to the hinges 70.

The valance 82 preferably extends downward along the window 80 to substantially hide the wiper motor and blade assemblies 92 from view. In particular, the integrally formed air deflector 90 of the valance 82 extends downward along the window 80 to hide the wiper motor and blade assemblies 92. The hinges 70 are likewise hidden by the valance 82 (i.e., air deflector 90) at the top or upper end of the window assembly 10. The valance 82 with integral air deflector 90 thus improves the appearance of the door 2 by hiding the functional elements of the window assembly 10. When not in use, the wiper blades 96 are generally stored behind the valance 82 (i.e., air deflector 90), which prevents damage to the wiper blades 96 and improves the overall appearance of the vehicle incorporating the door 2 of the present invention. The valance 82 is preferably made of molded plastic and may include structural members made of metal for improving the strength of the valance 82.

The locking hardware assembly 12 may further comprise a pair window locking mechanisms 100 that coact with window latches 101 (i.e., latch loops, for example) mounted on the inner side 88 of the window 80. The window latches 101 are mounted on the window 80, preferably at the lower corners of the window 80, by conventional means, for example with mechanical fasteners or adhesives. The window locking mechanisms 100 are preferably mounted to the hardware carrier 50 and coact in a conventional manner with the window latches 101 to lock the window 80 to the body of the door 2. The window locking mechanisms 100 prevent unauthorized entry into the vehicle through the window assembly 10. Once again, the use of two window locking mechanisms 100 provides redundancy and safety in the case of an accident involving the door 2 and increases the difficulty in breaking into the vehicle. The locations of the window locking mechanisms 100 and window latches 101 may be reversed in accordance with the present invention.

Figure 15:
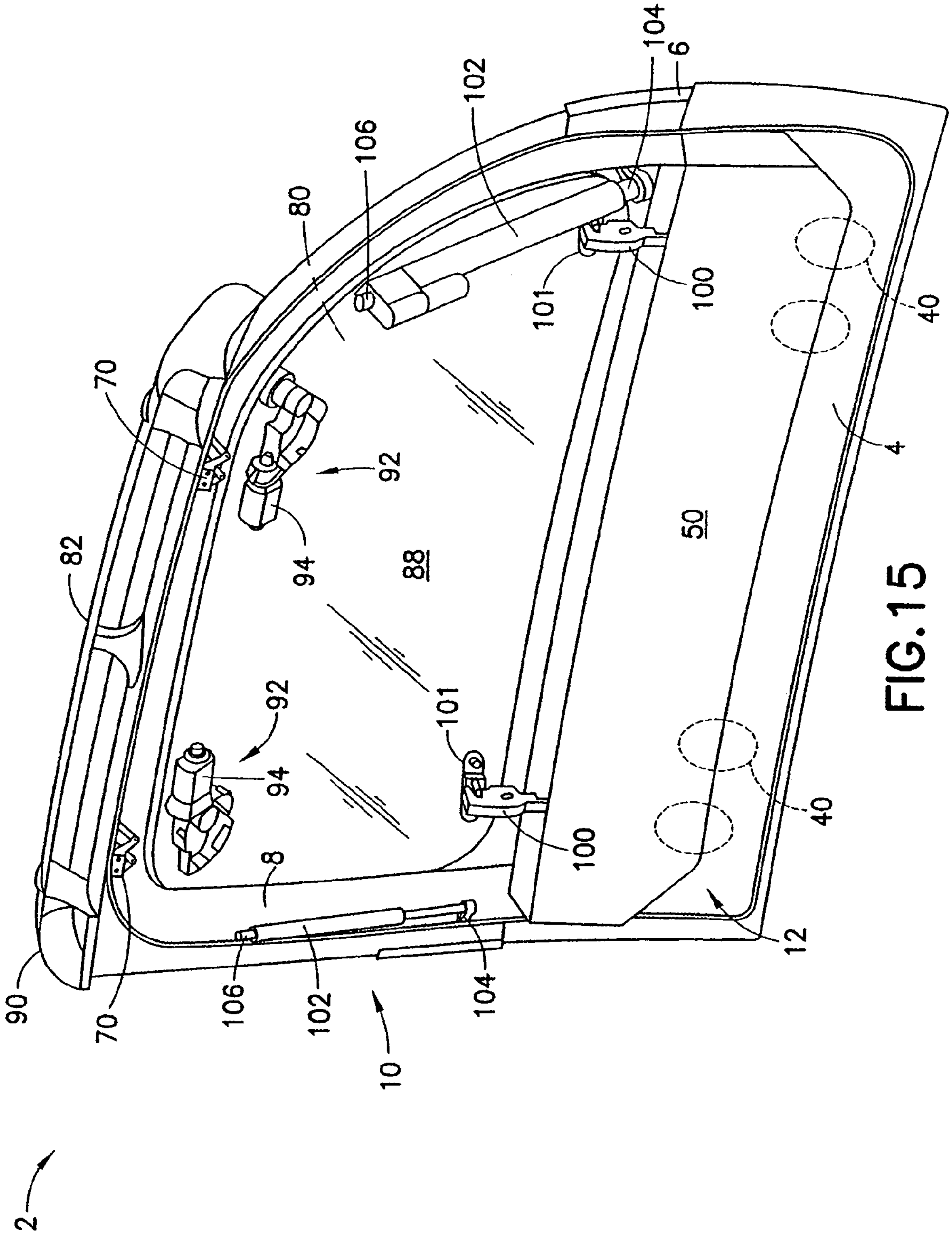
FIG. 15 is a perspective view showing the internal side of the vehicle door and the window assembly of FIG. 14.

The door 2 may further comprise one or more lift assist mechanisms 102 to assist a driver or passenger of the vehicle in lifting the door 2 to the open position. FIGS. 15 and 18 illustrate two possible lift assist mechanisms 102 for the door 2 in accordance with the present invention. The left side lift assist mechanism 102 is in the form of a conventional gas-assist strut. The right side lift assist mechanism 102 is illustrated as a powered linear screw strut. Either lift assist mechanism 102 may be used in the door 2 of the present invention. For example, the door 2 may include one or two gas-assist strut lift assist mechanisms 102, or one or two powered linear screw strut lift assist mechanisms 102 in accordance with the present invention. Additionally, the door 2 may include one gas-assist strut lift assist mechanism 102 and one powered linear screw strut lift assist mechanism 102. The powered linear screw strut embodiment of the lift assist mechanism 102 must be connected to a source of electrical power (i.e., the vehicle's electrical harness), and may be used to remotely open the door 2. The lift assist mechanisms 102 each include a first end 104 that is mounted to the frame member 8 and, preferably, the cross member 24 of the frame member 8. The first end 104 is preferably pivotally connected to the frame member 8. A second end 106 of the lift assist mechanisms 102 is preferably configured to connect the lift assist mechanism 102 to the vehicle body. The frame member 8, as discussed previously, is preferably formed with different cross section profiles 28, which provide locations for mounting various components of the door 2 to the frame member 8. Such elements include, for example, the hinges 70 and the lift assist mechanisms 102 discussed hereinabove.

The assembled door 2 of the present invention is approximately 35 millimeters in thickness at its thickest point, which is significantly thinner than prior art liftgates as indicated previously. Additionally, the use of lightweight aluminum for the various components of the door 2, particularly the inner and outer panels 4, 6 and frame member 8, provides a significant saving in weight in comparison to prior art liftgates that are primarily made from steel stampings. When installed on a vehicle, such a thin and lightweight door 2 provides more interior space within the vehicle thereby creating additional cargo carrying capacity.

Further, the door 2 of the present invention is more easily manufactured than prior art liftgates, particularly during the mounting of the locking hardware to the door 2. All mechanical aspects of the locking hardware assembly 12 are pre-assembled in a "cassette" or "module", the components of which may be tested and adjusted for performance, quality, and reliability before the locking hardware assembly 12 is mounted to the inner side 14 of the inner panel 4. Once the locking hardware assembly 12 is mounted to the inner side 14 of the inner panel 4, a decorative finishing trim panel (not shown) made of fabric, plastic, and the like is easily mounted to the inner side 14 of the inner panel 4 to cover the locking hardware assembly 12.

Moreover, the window assembly 10 of the present invention provides a convenient and user-friendly way of accessing the window opening 38 defined by the frame member 8 and the inner and outer panels 4, 6. The valance 82 of the window assembly 10 is formed to hide the functional aspects of the window assembly 10, such as the wiper motors 94, wiper blades 96, and the hinges 70, further enhancing the overall appearance of the door 2. Other components of the vehicle, such as a rear brake safety light 108, may also be incorporated into the window assembly 10. For example, the brake light 108 may be connected to the valance 82 (i.e., air deflector 90) of the window assembly 10. The components of the window assembly 10, such as the wiper motor and blade assemblies 92, window locking mechanisms 100, and brake light 108 may be pre-tested on the window assembly 10 prior to attaching the window assembly 10 to the door 2. Thus, the window assembly 10 is a distinct module in a similar manner to the locking hardware assembly 12, which may be pre-assembled and pre-tested prior to being assembled to the door 2. The "modular" nature of the window assembly 10 and locking hardware assembly 12 improves the overall quality and reliability of the door 2 of the present invention.

The present invention is also a method of assembling the door 2. The method may comprise the steps of (1) providing the inner and outer panels 4, 6; (2) providing the U-shaped frame member 8; (3) fixing the legs 26 of the frame member 8 to the outer side 16 of the inner panel 4, such that the inner panel 4 extends only part way up the legs 26 of the frame member 8; and (4) fixing the outer panel 6 to the inner panel 4 such that the inner side 34 of the outer panel 6 is positioned opposite the legs 26 and the outer side 16 of the inner panel 4, with the outer panel 6 extending only part way up the legs 26 of the frame member 8. The step of providing the inner and outer panels 4, 6 may comprise stamping the inner and outer panels 4, 6 simultaneously as one stamping. The inner and outer panels 4, 6 are each formed from a sheet of material, preferably aluminum sheet material. The inner and outer panels 4, 6 may then be separated in a trimming operation. The depressions 40 and recesses 18 in the inner panel 4 are preferably formed in the inner panel 4 after the stamping operation. The hardware carrier 50 of the locking hardware assembly 12 may be stamped simultaneously with the inner and outer panels 4, 6 from a sheet of material, preferably aluminum. The frame member 8 is preferably hydroformed from an aluminum tube with the cross sectional profiles 28 formed therein, as indicated previously.

Once the inner panel 4 is connected fixedly to the legs 26 of the frame member 8, the cushioning members 46 may be placed between the contact surfaces 44 on the raised portions 42 defined by the depressions 40 and the inner side 34 of the outer panel 6 to strengthen the outer panel 6. The cushioning members 46 are preferably manufactured from a foaming adhesive referred to as gumdrops. The gumdrops are applied to one of the surfaces being cushioned, for example, the contact surfaces 44 of the raised portions 42 prior to painting the door 2. The heat of the painting process, for example, is sufficient to cause the gumdrops to expand and fill the space between the contact surfaces 44 and the inner side 34 of the outer panel 6. After expansion, the inner and outer panels 4, 6 are tightly interconnected and the outer panel 6 has a minimal degree of flexibility as determined by a palming test.

Once the inner and outer panels 4, 6 and frame member 8 are assembled, the locking hardware assembly 12 may be fixed to the inner side 14 of the inner panel 4. Thereafter, the window assembly 10, discussed previously, may be attached to the cross member 24 of the frame member 8 by the hinges 70. As indicated previously, the window assembly 10 and locking hardware assembly 12 are preferably provided pre-assembled and pre-tested such that they may be affixed directly to the door 2. The "modular" nature of the window assembly 10 and locking hardware assembly 12 increase the reliability and quality of the assembled door 2 of the present invention, as discussed previously.

While the present invention was described with reference to preferred embodiments, those skilled in the art may make modifications and alterations to the invention without departing from the spirit and scope of the invention. Accordingly, the foregoing detailed description is intended to be illustrative rather than restrictive. The invention is defined by the appended claims, and all changes to the invention that fall within the meaning and range of equivalency of the claims are to be embraced within their scope.

What is claimed is:

1. A window assembly for a vehicle door, comprising:
- a window for covering a window opening in the vehicle door;
- at least one hinge comprising a first member, a second member configured to pivotally connect the vehicle door to the body of a vehicle, a third member, and a spring structured to provide a lift assist function for the window assembly, the first and third members each individually pivotally associated with the second member; and
- a valance connected to the window, the valance mounted to the third member for enabling pivotal movement of the window and valance independent of the vehicle door.

2. The window assembly of claim 1, the valance comprising an integrally formed air deflector extending downward along the window.

3. The window assembly of claim 1, further comprising at least one wiper motor and blade assembly mounted through the window and connected to the valance.

4. The window assembly of claim 1, further comprising at least one wiper motor and blade assembly mounted to the valance and positioned between the valance and an outer side of the window.

5. The window assembly of claim 1, further comprising at least one window latch mounted to the window for locking the window to the vehicle door.

6. The window assembly of claim 1, further comprising a brake light for a vehicle mounted to the valance.

7. A method of assembling a window assembly for a vehicle door, comprising the steps of:
- providing a window for covering a window opening in the vehicle door;
- attaching a valance to the window;

providing at least one hinge comprising a first member, a second member configured to pivotally connect the vehicle door to the body of a vehicle, a third member, and a spring structured to provide a lift assist function for the window assembly, the first and third members each individually pivotally associated with the second member; and mounting the valance to the third member for enabling pivotal movement of the window and valance independent of the vehicle door.

8. The method of claim 7, further comprising the steps of mounting at least one wiper motor and blade assembly through the window and connecting the at least one wiper motor and blade assembly to the valance.

9. The method of claim 7, further comprising mounting at least one wiper motor and blade assembly to the valance between the valance and an outer side of the window.

10. The method of claim 7, further comprising the step of mounting at least one window latch to the window for locking the window.

11. A window assembly for a vehicle door, comprising:

a window for covering a window opening in the vehicle door;

at least one hinge comprising a first member, a second member configured to pivotally connect the vehicle door to the body of a vehicle, and a third member, the first and third members each individually pivotally associated with the second member;

a valance connected to the window, the valance mounted to the third member for enabling pivotal movement of the window and valance independent of the vehicle door; and at least one wiper motor and blade assembly mounted through the window and connected to the valance.

12. A window assembly for a vehicle door, comprising:

a window for covering a window opening in the vehicle door;

at least one hinge comprising a first member, a second member configured to pivotally connect the vehicle door to the body of a vehicle, and a third member, the first and third members each individually pivotally associated with the second member;

a valance connected to the window, the valance mounted to the third member for enabling pivotal movement of the window and valance independent of the vehicle door; and at least one wiper motor and blade assembly mounted to the valance and positioned between the valance and an outer side of the window.

13. A method of assembling a window assembly for a vehicle door, comprising the steps of:

providing a window for covering a window opening in the vehicle door;

attaching a valance to the window;

providing at least one hinge comprising a first member, a second member configured to pivotally connect the vehicle door to the body of a vehicle, and a third member, the first and third members each individually pivotally associated with the second member;

mounting the valance to the third member for enabling pivotal movement of the window and valance independent of the vehicle door; and mounting at least one wiper motor and blade assembly through the window and connecting the at least one wiper motor and blade assembly to the valance.

14. A method of assembling a window assembly for a vehicle door, comprising the steps of:

providing a window for covering a window opening in the vehicle door;

attaching a valance to the window;

providing at least one hinge comprising a first member, a second member configured to pivotally connect the vehicle door to the body of a vehicle, and a third member, the first and third members each individually pivotally associated with the second member;

mounting the valance to the third member for enabling pivotal movement of the window and valance independent of the vehicle door; and mounting at least one wiper motor and blade assembly to the valance between the valance and an outer side of the window.

* * * * *